United States Patent
Uematsu

(10) Patent No.: US 11,041,536 B2
(45) Date of Patent: Jun. 22, 2021

(54) SPRING ASSEMBLY

(71) Applicant: PIOLAX, INC., Yokohama (JP)

(72) Inventor: Yasutaka Uematsu, Yokohama (JP)

(73) Assignee: PIOLAX, INC., Yokohama (JP)

( * ) Notice: Subject to any disclaimer, the term of this patent is extended or adjusted under 35 U.S.C. 154(b) by 68 days.

(21) Appl. No.: 16/478,812

(22) PCT Filed: Jan. 26, 2018

(86) PCT No.: PCT/JP2018/002415
§ 371 (c)(1),
(2) Date: Jul. 17, 2019

(87) PCT Pub. No.: WO2018/143071
PCT Pub. Date: Aug. 9, 2018

(65) Prior Publication Data
US 2019/0376574 A1 Dec. 12, 2019

(30) Foreign Application Priority Data
Jan. 31, 2017 (JP) .............................. JP2017-015763

(51) Int. Cl.
*F16F 1/12* (2006.01)
*F16F 3/04* (2006.01)

(52) U.S. Cl.
CPC ................ *F16F 3/04* (2013.01); *F16F 1/128* (2013.01); *F16F 1/125* (2013.01)

(58) Field of Classification Search
CPC .... F16F 3/04; F16F 1/128; F16F 1/125; F16F 2230/0052; F16F 2228/08
See application file for complete search history.

(56) References Cited

U.S. PATENT DOCUMENTS

| 4,186,914 A | 2/1980 | Radwill et al. |
| 5,306,086 A | 4/1994 | Orlowski et al. |

(Continued)

FOREIGN PATENT DOCUMENTS

| JP | S48-075085 U | 9/1973 |
| JP | S58-053932 U | 4/1983 |

(Continued)

OTHER PUBLICATIONS

International Search Report (ISR) (PCT Form PCT/ISA/210), in PCT/JP2018/002415, dated Mar. 20, 2018 (English and Japanese versions).

(Continued)

*Primary Examiner* — Thomas W Irvin
(74) *Attorney, Agent, or Firm* — McGinn I.P. Law Group, PLLC.

(57) ABSTRACT

A spring assembly includes coil springs supported on a spring support member. The coil springs include plural first coil springs and a second coil spring. The spring support member includes a first support member and a second support member facing the first support member. One ends of the first coil springs are supported on a front surface of the first support member. One end of the second coil spring is supported on the front surface of the first support member or a front surface of the second support member, and in this state, another end of the second coil spring protrudes further than other ends of the first coil springs. A sum of elastic repulsive forces of the first coil springs is larger than an elastic repulsive force of the second coil spring in a state where the first coil springs and the second coil spring are compressed.

20 Claims, 34 Drawing Sheets

(56) References Cited

U.S. PATENT DOCUMENTS

| | | | |
|---|---|---|---|
| 6,575,439 B1 | 6/2003 | Costello et al. | |
| 7,954,436 B2* | 6/2011 | Gorski | B61F 5/36 105/218.1 |
| 8,312,853 B2* | 11/2012 | Iwata | F01L 3/10 123/90.67 |
| 8,584,596 B1* | 11/2013 | Worden | B61C 15/04 105/157.1 |
| 9,074,642 B2* | 7/2015 | McFarland | F16H 63/3026 |
| 9,581,209 B2* | 2/2017 | Kramm | F16D 25/0638 |
| 2010/0139596 A1* | 6/2010 | Iwata | F16F 3/04 123/90.67 |
| 2011/0221159 A1* | 9/2011 | Gorski | B61F 5/36 280/124.179 |
| 2012/0286462 A1* | 11/2012 | Pepka | F16F 3/04 267/177 |
| 2020/0173519 A1* | 6/2020 | S. | F16F 7/12 |
| 2020/0191223 A1* | 6/2020 | Doetterl | B21D 53/16 |

FOREIGN PATENT DOCUMENTS

| | | |
|---|---|---|
| JP | H01-111837 U | 7/1989 |
| JP | H06-043379 U | 6/1994 |
| JP | H08-504920 A | 5/1996 |
| JP | H10-311357 A | 11/1998 |
| JP | 2003-247579 A | 9/2003 |

OTHER PUBLICATIONS

Written Opinion of the International Searching Authority (PCT/ISA/237), in PCT/JP2018/002415, dated Mar. 20, 2018 (Japanese version).

(PCT/IPEA/409), in PCT/JP2018/002415 (Japanese version) International Preliminary Report on Patentability (PCT/IPEA/409), in PCT/JP2018/002415, dated Feb. 26, 2019.

* cited by examiner

SPRING ASSEMBLY

TECHNICAL FIELD

The present invention relates to a spring assembly that supports a plurality of coil springs.

BACKGROUND ART

Conventionally, a spring assembly formed by providing a plurality of coil springs to stand on an annular plate member is used, for example, as a spring that biases a piston assembled in an automatic transmission of an automobile.

For example, Patent Literature 1 describes a spring assembly that includes an annular plate formed with a plurality of cut-and-raised holes in the circumferential direction and a plurality of coil springs having one ends fixed on the annular plate by crimping in which cylindrical protrusions raising from inner peripheral edges of the cut-and-raised holes are expanded. When the coil springs are compressed from a free state in which no load is applied thereto, a load due to an elastic repulsive force corresponding to the stroke amount (amount of compression of the springs) acts. That is, the coil springs have such a load characteristic that the load increases in proportion to an increase in the stroke amount of the coil springs.

CITATION LIST

Patent Literature

Patent Literature 1: JP-A-H10-311357

SUMMARY OF INVENTION

Technical Problem

In some usage, a spring assembly may be required to have different load characteristics in a plurality of stages, in which a load is low in an initial stage of a spring stroke where the stroke amount of the coil springs is small and is high in a later stage of the spring stroke.

However, the above-described load characteristics cannot be obtained by the spring assembly described in Patent Literature 1, in which the load characteristic is such that the stroke amount of the coil springs and the load are proportional to each other, so that a relatively high load is generated even in an initial stage of a stroke when the stroke amount of the coil springs is small.

Accordingly, an object of the present invention is to provide a spring assembly that has different load characteristics in a plurality of stages in which load is low in an initial stage of a spring stroke and is high in a later stage of the spring stroke.

Solution to Problem

In order to achieve the above object, the present invention provides a spring assembly including coil springs supported on a spring support member. The coil springs include at least a plurality of first coil springs and a second coil spring. The spring support member includes a first support member, or includes a first support member and a second support member disposed to face the first support member. One ends of the plurality of first coil springs are supported on a front surface of the first support member. One end of the second coil spring is supported on the front surface of the first support member or a front surface of the second support member, and in this state, another end of the second coil spring protrudes further than other ends of the plurality of first coil springs. A sum of elastic repulsive forces of the plurality of first coil springs is larger than an elastic repulsive force of the second coil spring in a state where the plurality of first coil springs and the second coil spring are compressed.

Advantageous Effects

According to the spring assembly of the present invention, when the coil springs of the spring assembly are pressed by a pressing member such as a piston, the other end of the second coil spring is compressed first. When the other end is compressed to a length of not protruding from the other ends of the first coil springs, the other ends of the plurality of first coil springs are compressed by pressing member. Therefore, at an initial stage of a spring stroke when the stroke amount of the coil springs is small, a low load can be obtained due to only the elastic repulsive force of the second coil spring. At a later stage of the spring stroke when the stroke amount of the coil springs is large, a load higher than the initial stage of the spring stroke can be obtained due to the sum of the elastic repulsive forces of the plurality of first coil springs, which is larger than the elastic repulsive force of the second coil spring, as well as the elastic repulsive force of the second coil spring. Accordingly, a spring assembly can be obtained that have different load characteristics in at least two stages.

BRIEF DESCRIPTION OF DRAWINGS

FIGS. 33A and 33B show a spring assembly according to a ninth embodiment of the present invention, wherein FIG. 33A is an enlarged cross-sectional view of a main part of the spring assembly before assembly of a first support member and a second support member, and FIG. 33B is an enlarged cross-sectional view of the main part of the spring assembly after assembly of the first support member and the second support member.

FIGS. 34A and 34B show a spring assembly according to a tenth embodiment of the present invention, wherein FIG. 34A is an enlarged cross-sectional view of a main part of the spring assembly before assembly of a first support member and a second support member, and FIG. 34B is an enlarged cross-sectional view of the main part of the spring assembly after assembly of the first support member and the second support member.

DESCRIPTION OF EMBODIMENTS

A spring assembly according to a first embodiment of the present invention will be described below with reference to FIGS. 1 to 6.

Figure 1:
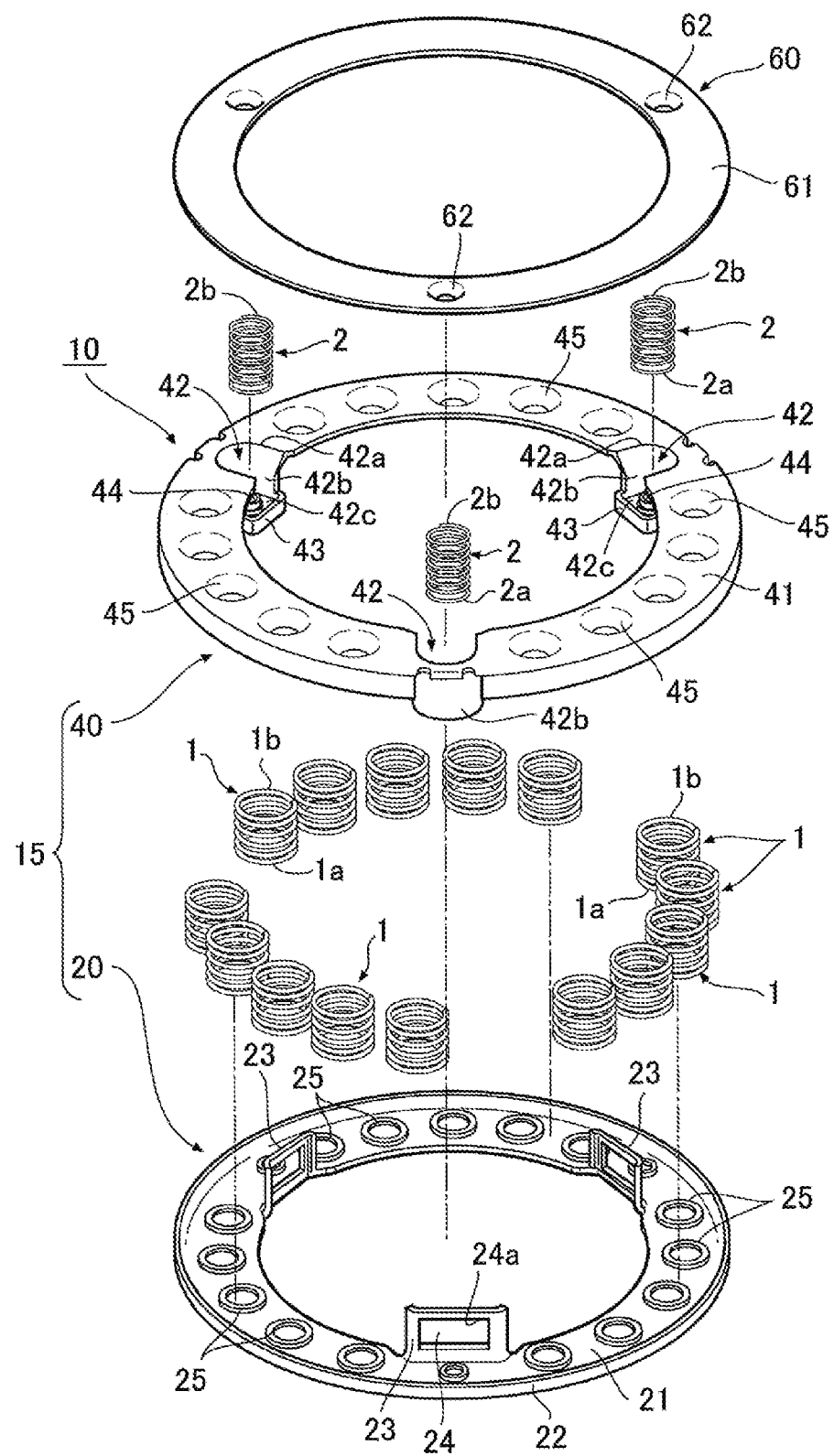
FIG. 1 is an exploded perspective view of a spring assembly according to a first embodiment of the present invention.

A spring assembly 10 as illustrated in FIG. 1 includes coil springs supported on a spring support member 15. The coil springs include at least a plurality of first coil springs 1 and one or a plurality of second coil springs 2. The number of the second coil springs 2 in this embodiment is plural but may be singular (one). Additionally, three or more types of coil springs may be used (which will be described below in a fourth embodiment and a fifth embodiment).

The spring support member 15 in this embodiment includes a first support member 20 and a second support member 40 disposed to face the first support member 20. The spring support member may only include the first support member.

The spring assembly 10 can be used as, for example, a piston return spring that biases a piston for hydraulic control assembled in an automatic transmission of an automobile. However, the applicable situation and the installation location are not particularly limited.

The first coil springs 1 and the second coil springs 2 are formed by winding a metal wire having a predetermined diameter at predetermined pitches. In this embodiment, the second coil springs 2 have an outer diameter smaller than that of the first coil springs 1 and are longer than the first coil springs 1 (see FIG. 1). One ends 1a of the plurality of first coil springs 1 are supported on a front surface of the first support member 20, and one ends 2a of the plurality of second coil springs 2 are supported on a front surface of the second support member 40.

As illustrated in FIG. 1, the first support member 20 constituting the spring support member 15 includes a base plate 21 having an annular shape. The base plate 21 includes an annular rib 22 erected toward the second support member 40 from a peripheral edge on an outer diameter side. The base plate 21 includes a plurality of holding walls 23 erected toward the second support member 40 at predetermined intervals in the circumferential direction from a peripheral edge on an inner diameter side (herein three holding walls 23 are provided). The holding walls 23 have frame shapes having horizontal long slide holes 24, into which holding protrusions 43 provided on the second support member 40 to be described below are slidably inserted (see FIGS. 3 to 5).

The base plate 21 includes circular support protrusions 25 protruding toward the second support member 40 at equal intervals in the circumferential direction between adjacent holding walls 23 in the circumferential direction. In this embodiment, five support protrusions 25 are provided between the three holding walls 23, respectively. The support protrusions 25 are inserted into inner peripheries of the one ends 1a of the first coil springs 1 and tip ends thereof are crimped toward an outer radial direction, so that the one ends 1a of the first coil springs 1 are supported on the front surface of the base plate 21 (that is, the front surface of the first support member 20) by the support protrusions 25 (see FIG. 3).

The shape of the first support member 20, the shape, the position, the number and the like of the holding walls 23, the shape, the number and the like of the support protrusions 25 are not particularly limited (the same applies to other embodiments described below). For example, the base plate 21 may have a rectangular annular shape, a plate shape or the like, and the support protrusions 25 may have a cut-and-raised shape instead of the circular shape and may be disposed to be unequally spaced in the circumferential direction of the base plate 21.

On the other hand, the second support member 40 includes a base plate 41 having an annular shape that corresponds to the base plate 21 of the first support member 20. The base plate 41 includes recesses 42 recessed toward the first support member 20. A plurality of the recesses 42 are provided at predetermined intervals in the circumferential direction of the base plate 41. Herein, three recesses 42 are provided corresponding to the three holding walls 23 provided on the first support member 20 (see FIG. 1).

As illustrated in FIG. 1, the recesses 42 include notches 42a formed by cutting the base plate 41 on an inner diameter side substantially in a U shape, peripheral walls 42b extending toward the first support member 20 from peripheral edges of the notches 42a, and bottom walls 42c provided on tip end sides of the peripheral walls 42b in the extending direction. The recesses 42 are opened upward and to the inner diameter side of the base plate 41. The holding protrusions 43 are provided on end portions of the bottom walls 42c on the inner diameter side of the base plate 41, and the holding protrusions 43 extend toward a side opposite to the first support member 20. The holding protrusions 43 are engageable with inner peripheries 24a (inner peripheries on the side away from the base plate 21) of the slide holes 24 of the holding walls 23 (see FIG. 3). When the holding protrusions 43 engage with the inner peripheries 24a of the slide holes 24 of the holding walls 23, a distance D (see FIG. 3) between the front surface of the base plate 21 of the first support member 20 and a back surface of the base plate 41 of the second support member 40 is shorter than the free length of the first coil springs 1.

Figure 3:
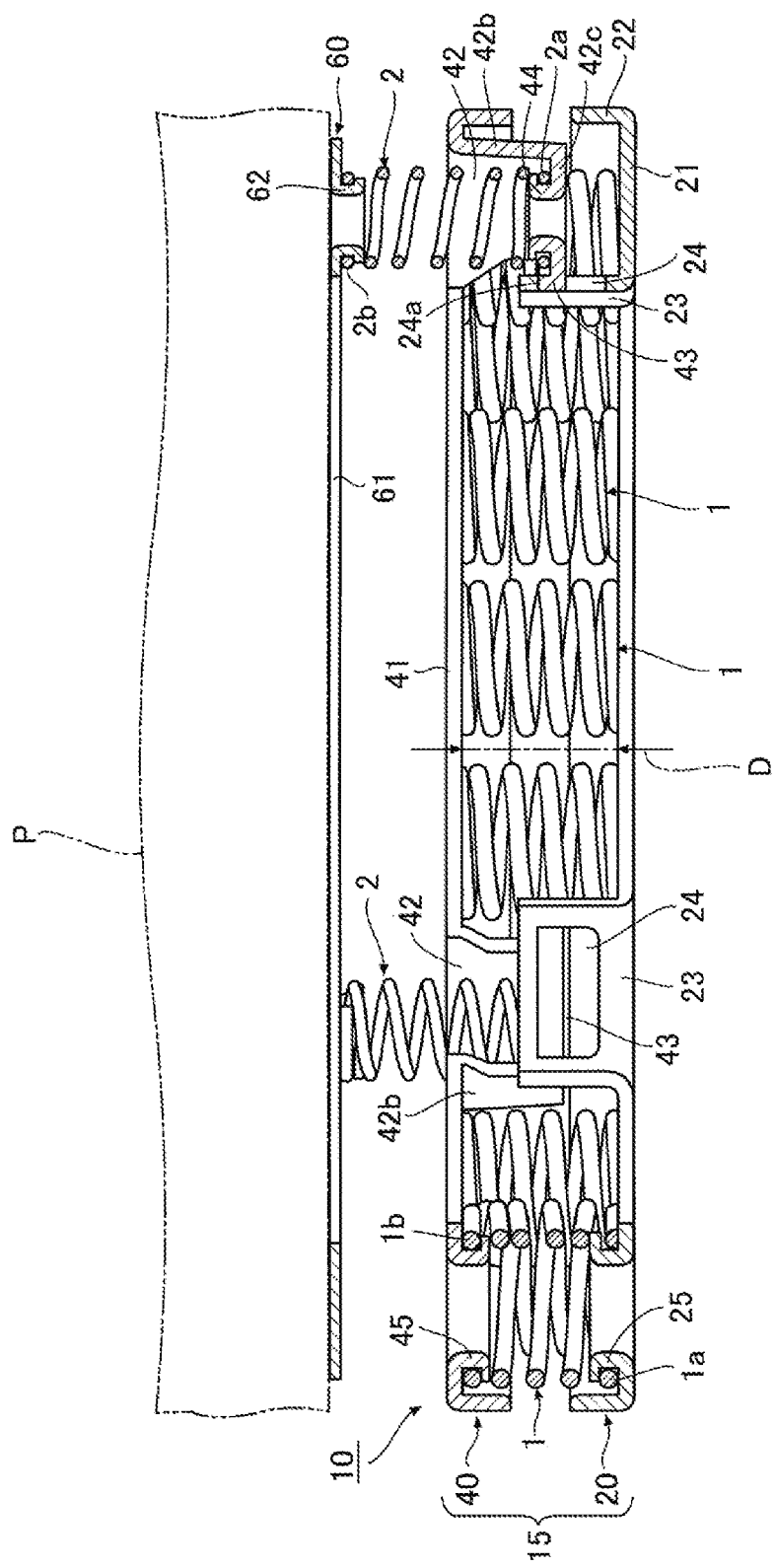
FIG. 3 is a cross-sectional view of the spring assembly.

As illustrated in FIG. 3, the bottom walls 42c of the recesses 42 include circular support protrusions 44 protruding in a direction away from the first support member 20. The support protrusions 44 are inserted into inner peripheries of the one ends 2a of the second coil springs 2 and tip ends thereof are crimped toward an outer radial direction, so that the one ends 2a of the second coil springs 2 are supported on front surfaces of bottom walls 42c (that is, the front surfaces of the recesses 42, which is also the front surface of the second support member 40) by the support protrusions 44 (see FIG. 3).

In the present invention, "front surface of the second support member" refers to the surface opposite to a surface thereof facing the first support member 20, including the front surfaces of the recesses 42. The one ends 2a of the second coil springs 2 may also be supported on the front surface of the first support member (which will be described below in a second embodiment).

The base plate 41 includes circular support protrusions 45 protruding toward the first support member 20 at equal intervals in the circumferential direction between adjacent recesses 42 in the circumferential direction. In this embodiment, five support protrusions 45 are provided between the three recesses 42, respectively. The support protrusions 45 are inserted into inner peripheries of the other ends 1b of the first coil springs 1 and tip ends thereof are crimped toward an outer radial direction, so that the other ends 1b of the first coil springs 1 are supported on the back surface of the base plate 41 (that is, the back surface of the second support member 40) by the support protrusions 45 (see FIG. 3).

Since the distance D (see FIG. 3) between the front surface of the base plate 21 of the first support member 20 and the back surface of the base plate 41 of the second support member 40 is shorter than the free length of the first coil springs 1 when the holding protrusions 43 engage with the inner peripheries 24a of the slide holes 24 of the holding walls 23, the first coil springs 1 can be held in a compressed state when the holding protrusions 43 engage with the inner peripheries 24a of the slide holes 24 of the holding walls 23, as illustrated in FIG. 3. That is, in this embodiment, the slide holes 24 of the holding walls 23 of the first support member 20 and the holding protrusions 43 of the second support member 40 constitute a "holding mechanism" provided between the first support member and the second support member in the present invention, which holds the plurality of first coil springs 1 in the compressed state. Further, the holding mechanism allows the first support member 20 and the second support member 40 to move close to or away from each other, and allows the second support member 40 to be assembled not to come off from the first support member 20.

The shape of the second support member 40, the shape, the position, the number and the like of the recesses 42, the shape, the number and the like of the holding protrusion 43 are not particularly limited (the same applies to other embodiments described below). For example, the base plate 41 may have a rectangular annular shape, a plate shape or the like, peripheral walls 42b of the recesses 42 may be divided walls instead of a continuous wall, and the recesses 42 may be opened on the outer diameter side. The holding protrusions 43 may face the first support member 20 and have a straight shape without protruding as long as it is engageable with the inner peripheries 24a of the slide holes 24 of the holding walls 23.

As described above, the one ends 1a of the plurality of first coil springs 1 are supported on the front surface of the first support member 20 (herein the front surface of the base plate 21), and the one ends 2a of the plurality of second coil springs 2 are supported on the front surface of the second support member 40 (herein the front surfaces of the bottom walls 42c of the recesses 42). In this state, as illustrated in FIG. 3, the other ends 2b of the second coil springs 2 protrude further than the other ends 1b of the plurality of first coil springs 1.

The other ends 2b of the plurality of second coil springs 2 are supported on a pressing plate 60. The pressing plate 60 includes a base plate 61 having an annular shape that corresponds to the base plate 21 of the first support member 20 and the base plate 41 of the second support member 40. The base plate 61 includes a plurality of (herein three) circular support protrusions 62 protruding toward the second support member 40 at equal intervals in the circumferential direction. The support protrusions 62 are inserted into inner peripheries of the other ends 2b of the second coil springs 2 and tip ends thereof are crimped toward an outer radial direction, so that the other ends 2b of the second coil springs 2 are supported on a back surface of the pressing plate 60 by the support protrusions 62 (see FIG. 3).

Figure 4:
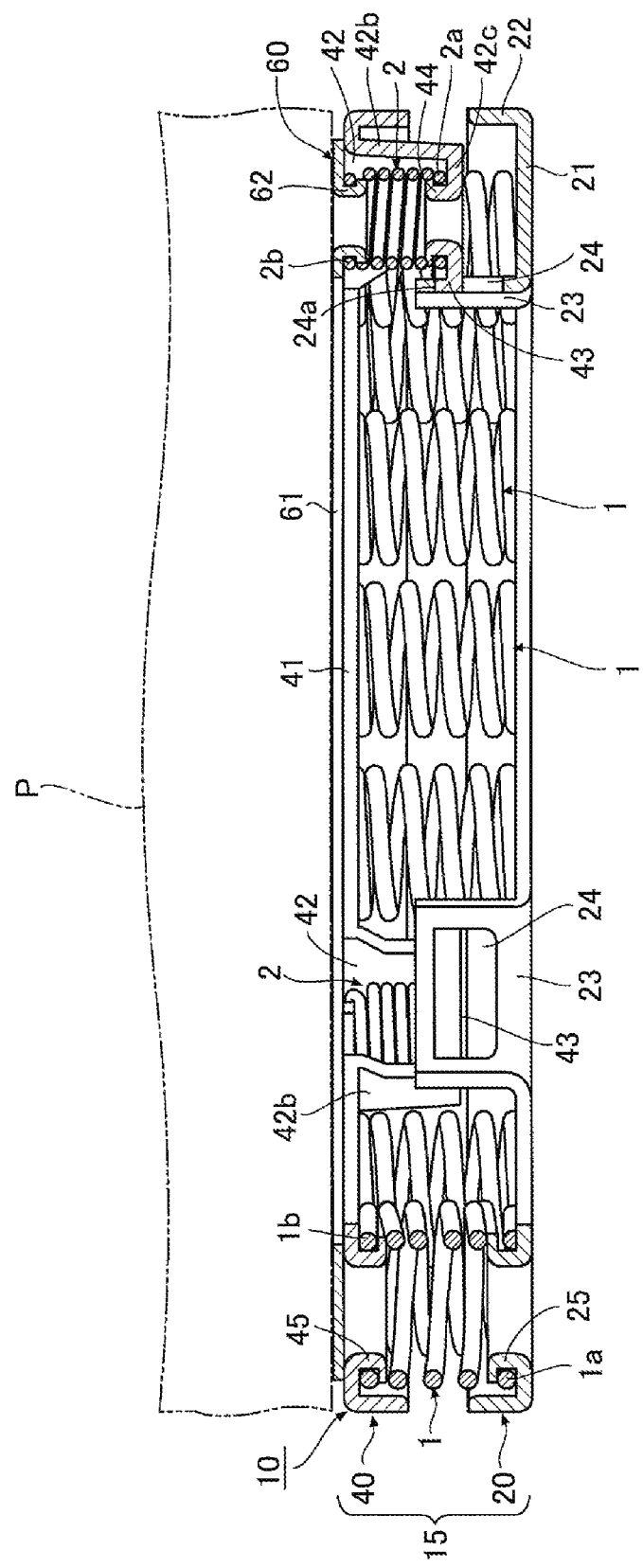
FIG. 4 is a cross-sectional view when a second support member is moved toward a first support member from the state in FIG. 3.
Figure 5:
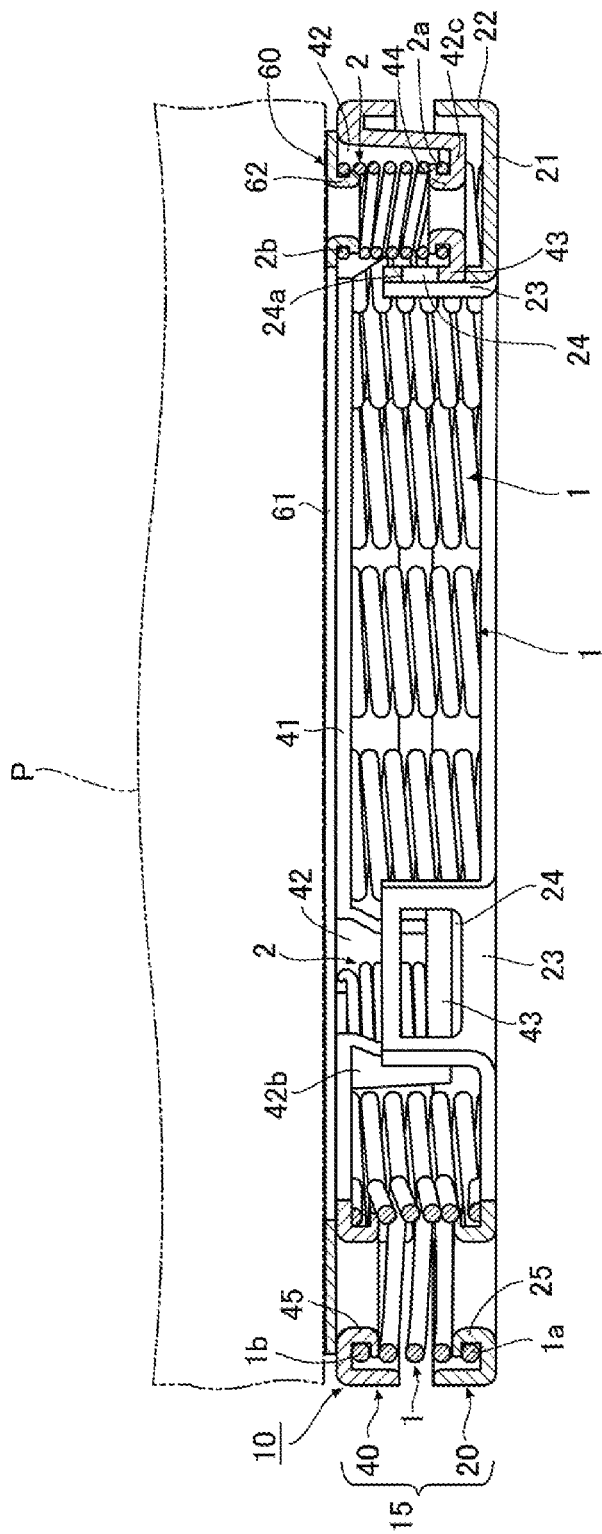
FIG. 5 is a cross-sectional view when the second support member is further moved toward the first support member from the state in FIG. 4.

The pressing plate 60 is pressed by a pressing member P such as a piston, and the other ends 2b of the plurality of second coil springs 2 are indirectly compressed by the pressing member P (see FIGS. 4 and 5). The other ends 2b of the plurality of second coil springs 2 may be not supported by the pressing plate 60 and directly pressed by the pressing member P.

Figure 2:
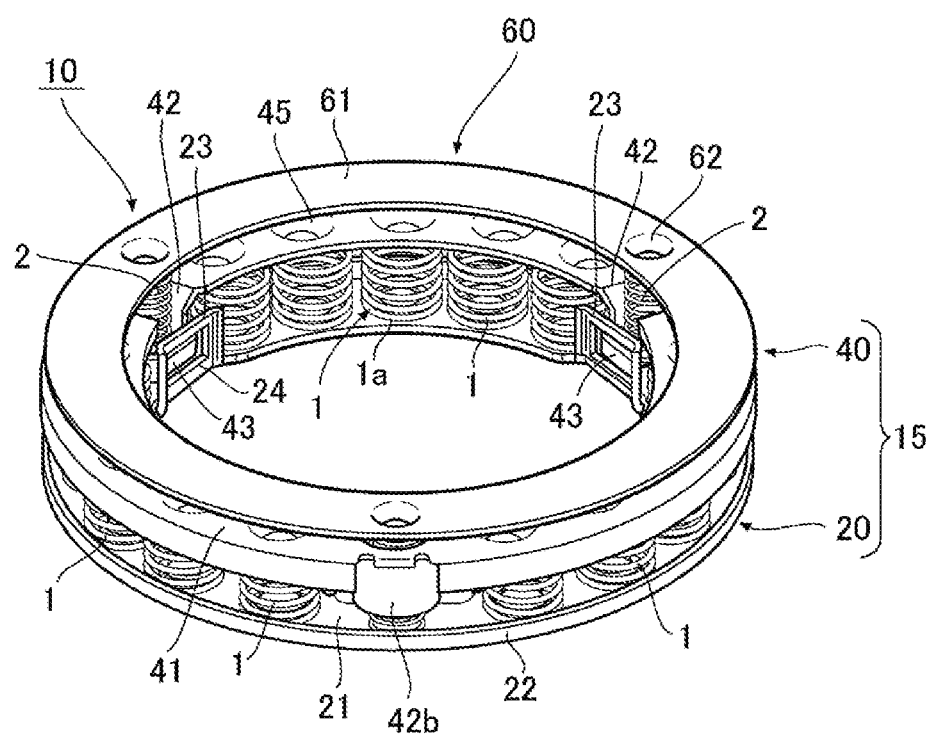
FIG. 2 is a perspective view of the spring assembly.

As described above, the one ends 1a of the plurality of first coil springs 1 are supported on the front surface of the base plate 21 of the first support member 20, and the other ends 1b are supported on the back surface of the base plate 41 of the second support member 40; the one ends 2a of the plurality of second coil springs 2 are supported on the front surfaces of the bottom walls 42c of the second support member 40, and the other ends 2b are supported on the back surface of the pressing plate 60, thereby the spring assembly 10 being configured as illustrated in FIG. 2.

In this embodiment, as illustrated in FIGS. 1 and 2, although the first coil springs 1 and the second coil springs 2 are illustrated not to overlap each other in the circumferential direction of the spring support member 15, they may be coaxial with each other.

Additionally, both ends 1a and 1b of the first coil springs 1 and both ends 2a and 2b of the second coil springs 2 are fixed and supported on the first support member 20, the second support member 40, and the pressing plate 60 respectively by crimping of the support protrusions 25 of the first support member 20, the support protrusions 45 of the second support member 40, and the support protrusions 62 of the pressing plate 60. However, the method for fixing and supporting the coil springs is not particularly limited and may be performed, for example, by welding or an adhesive instead of the crimping.

In this embodiment, as illustrated in FIG. 3, both ends 1a and 1b of the first coil springs 1 may be not fixed to the first support member 20 or the second support member 40 since the plurality of first coil springs 1 are held in the compressed state by the holding mechanism including the holding walls 23 of the first support member 20 and the holding protrusions 43 of the second support member 40.

FIG. 3 illustrates an initial state of a spring stroke in which a pressing force from the pressing member P is not applied to the spring assembly 10 and the stroke amount (amount of compression) of the coil springs (the first coil springs 1 and the second coil springs 2) is small.

In the spring assembly 10, in a state where the pressing force from the pressing member P is applied to the spring assembly 10 from the initial state of the spring stroke illustrated in FIG. 3, the one or plurality of second coil springs 2 are compressed to a length at which the other ends 2b thereof do not protrude from the other ends 1b of the plurality of first coil springs 1, and the plurality of first coil springs 1 are compressed, (see FIG. 4), a sum of elastic repulsive forces of the plurality of first coil springs 1 is larger than an elastic repulsive force of the one second coil spring 2 or a sum of elastic repulsive forces of the plurality of second coil springs 2 (herein the sum of the elastic repulsive forces of the plurality of first coil springs 1 is larger than the sum of the elastic repulsive forces of the plurality of the second coil springs 2).

That is, in the present invention, "elastic repulsive force of the second coil spring" refers to the elastic repulsive force of the second coil spring only when the second coil spring 2 is singular, and refers to the sum of the elastic repulsive forces of the plurality of second coil springs when the second coil spring 2 is plural.

In the above description, "the one or plurality of second coil springs are compressed to a length at which the other ends thereof do not protrude from the other ends of the plurality of first coil springs" refers to, when the second support member 40 is provided, compressing the second coil springs 2 to a length at which the other ends 2b thereof do not protrude relative to a sum of the length of the first coil springs 1 and the thickness (herein the plate thickness of the base plate 41) of the second support member 40 (see FIG. 4).

As described above, the other ends 2b of the second coil springs 2 receive the pressing force from the pressing member P directly or indirectly and are compressed. Before the other ends 2b of the second coil springs 2 receive the pressing force from the pressing member P and are compressed and the pressing member P directly or indirectly abuts the second support member 40 (before the state in FIG. 4), the sum of the elastic repulsive forces of the plurality of first coil springs 1 is larger than the elastic repulsive force of the second coil spring 2 (the sum of the elastic repulsive forces of the second coil springs 2 when the second coil spring 2 is plural).

In the above description, when the other ends 2b of the second coil springs 2 receive the pressing force indirectly from the pressing member P, as in the first embodiment and the second embodiment illustrated in FIGS. 7 to 12, it means that the other ends 2b of the second coil springs 2 are pressed by the pressing member P via the pressing plate 60. At this time, the pressing member P indirectly abuts the second support members 40 and 40A via the pressing plate 60. On the other hand, when the other ends 2b of the second coil springs 2 receive the pressing force directly from the pressing member P, as in a third embodiment illustrated in FIGS. 13 to 16, it means that the other ends 2b of the second coil springs 2 are pressed by the pressing member P. At this time, the pressing member P directly abuts a second support member 40B.

This embodiment describes a structure including, as illustrated in FIGS. 1 to 3, fifteen first coil springs 1 and three second coil springs 2. However, the number of the first coil springs 1 and the number of the second coil springs 2 are not particularly limited, as long as the sum of the elastic repulsive forces of the plurality of first coil springs 1 is larger than the sum of the elastic repulsive forces of the plurality of second coil springs 2 at least before the other ends 2b of the second coil springs 2 are compressed by the pressing member P and the pressing member P abuts the second support member 40.

Next, operation and effects of the spring assembly 10 having the above structure will be described.

Figure 6:
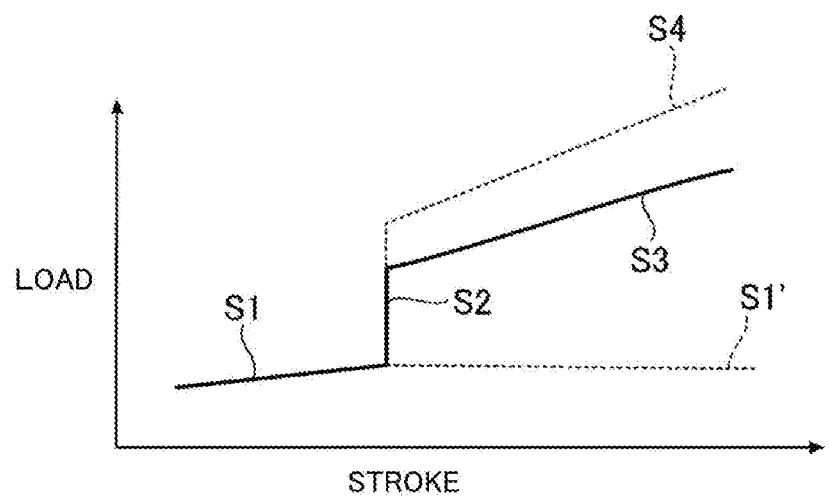
FIG. 6 is a graph showing a relationship between a spring stroke and a load of the spring assembly.

FIG. 6 illustrates a relationship between the stroke amount and a load of the coil springs of the spring assembly 10 according to this embodiment. The relationship will be described with reference to FIG. 6.

That is, when the pressing member P such as a piston moves in the direction of approaching the first support member 20 from the initial state of the spring stroke illustrated in FIG. 3, the other ends 2b of the plurality of second coil springs 2 are compressed by the pressing plate 60. At this time, as indicated by a reference numeral S1 in FIG. 6, the stroke amount of the second coil springs 2 gradually increases and the load increases due to the elastic repulsive forces of the plurality of second coil springs 2.

When the pressing plate 60 abuts the second support member 40, as illustrated in FIG. 4, the other ends 2b of the plurality of second coil springs 2 are compressed to a length of not protruding from the other ends 1b of the first coil springs 1, and further compression of the plurality of second coil springs 2 is restricted. At this time, as indicated by a reference numeral S2 in FIG. 6, the stroke amount of the second coil springs 2 does not increase, while the load thereof rapidly increases by a load based on reaction from the second support member 40 due to the pressing plate 60 abutting the second support member 40.

When the pressing member P further moves toward the first support member 20, as illustrated in FIG. 5, the other ends 1b of the plurality of first coil springs 1 are compressed by the second support member 40. At this time, as indicated by a reference numeral S3 in FIG. 6, the stroke amount of the plurality of first coil springs 1 gradually increases and the load increases due to the elastic repulsive forces of the plurality of first coil springs 1. Since the compression of the plurality of second coil springs 2 is restricted, a load due to the elastic repulsive forces of the second coil springs 2 does not increase and is constant (see a reference numeral S1' in FIG. 6).

In the spring assembly 10 as described above, when the pressing member P moves in the direction of approaching the first support member 20, the other ends 2b of the plurality of second coil springs 2 are compressed first. When the other ends 2b are compressed to a length of not protruding from the other ends 1b of the first coil springs 1 (see FIG. 4), the other ends 1b of the plurality of first coil springs 1 are compressed from this time on (see FIG. 5). Therefore, at an initial stage of the spring stroke (see the reference numeral S1 in FIG. 6), a low load can be obtained due to only the elastic repulsive forces of the plurality of second coil springs 2. At a later stage of the spring stroke when the stroke amount of the coil springs is large, a load higher than the initial stage of the spring stroke can be obtained due to the sum of the elastic repulsive forces of the plurality of first coil springs 1, which is larger than the sum of the elastic repulsive forces of the plurality of second coil springs 2, as well as the constant elastic repulsive forces of the plurality of second coil springs 2 (see the reference numeral S3 in FIG. 6). Accordingly, the spring assembly 10 can be obtained that has different load characteristics in at least two stages.

In this embodiment, the plurality of first coil springs 1 are held in the compressed state by the holding mechanism (the holding walls 23 of the first support member 20 and the holding protrusions 43 of the second support member 40) provided between the first support member 20 and the second support member 40, as illustrated in FIG. 3. Therefore, the plurality of first coil springs 1 are maintained in the state of being held by the holding mechanism even when the plurality of second coil springs 2 are pressed by the pressing member P. After the other ends 2b of the plurality of second coil springs 2 are compressed to a length of not protruding from the other ends 1b of the first coil spring 1 (see FIG. 4), the plurality of first coil springs 1 are pressed (see FIG. 5). Therefore, a state in which only the elastic repulsive forces of the plurality of second coil springs 2 act can be smoothly switched to a state in which both the elastic repulsive forces of the plurality of first coil springs 1 and the elastic repulsive forces of the plurality of second coil springs 2 act (see reference numerals S2 and S3 in FIG. 6). When the first coil springs 1 are not compressed, it may be difficult to obtain a characteristic as illustrated in FIG. 6 that the load is greatly switched during operation.

In this embodiment, the one ends 2a of the plurality of second coil springs 2 are supported on the front surfaces (herein the front surfaces of the bottom walls 42c of the recesses 42) of the recesses 42 provided on the second support member 40 constituting the spring support member 15. Therefore, when the plurality of second coil springs 2 are compressed by the pressing member P to a length at which the other ends 2b thereof do not protrude from the other ends 1b of the first coil springs 1 and the pressing member P abuts the second support member 40 (see FIG. 4), the compression of the second coil springs 2 is restricted and an increase in the elastic repulsive force thereof can be prevented. Thereafter, the elastic repulsive forces of the plurality of first coil springs 1 and the constant elastic repulsive forces by the plurality of second coil springs 2 act (see FIG. 5 and the reference symbol S3 in FIG. 6). Accordingly, the load can be easily adjusted and an excessive increase thereof can be prevented at the later stage of the spring stroke.

A reference numeral S4 in FIG. 6 indicates a load characteristic of a structure according to the second embodiment to be described below, that is, a structure in which compression of the plurality of second coil springs 2 is not restricted and a load by the plurality of first coil springs 1 and the plurality of second coil springs 2 acts after the plurality of second coil springs 2 are compressed to a length at which the other ends 2b thereof do not protrude from the other ends 1b of the first coil springs 1. As indicated by reference numerals S3 and S4 in FIG. 6, in the present embodiment, an increase in the load can be prevented at the later stage of the spring stroke as compared with the second embodiment.

In this embodiment, before the other ends 2b of the plurality of second coil springs 2 are compressed by the pressing member P and the pressing member P abuts the second support member 40 (see FIG. 3), the sum of the elastic repulsive forces of the plurality of first coil springs 1 is larger than the sum of the elastic repulsive forces of the plurality of second coil springs 2. Therefore, it is easy to adjust the load at the initial stage of the spring stroke since the elastic repulsive forces of the plurality of second coil springs 2 act alone until the pressing member P compresses the plurality of second coil springs 2 to abut the second support member 40.

FIGS. 7 to 12 illustrate a spring assembly according to a second embodiment of the present invention. The same parts as those in the above embodiment are denoted by the same reference numerals, and descriptions thereof will be omitted.

A spring assembly 10A according to the second embodiment differs from the first embodiment in a support structure of a plurality of second coil springs 2.

Figure 7:
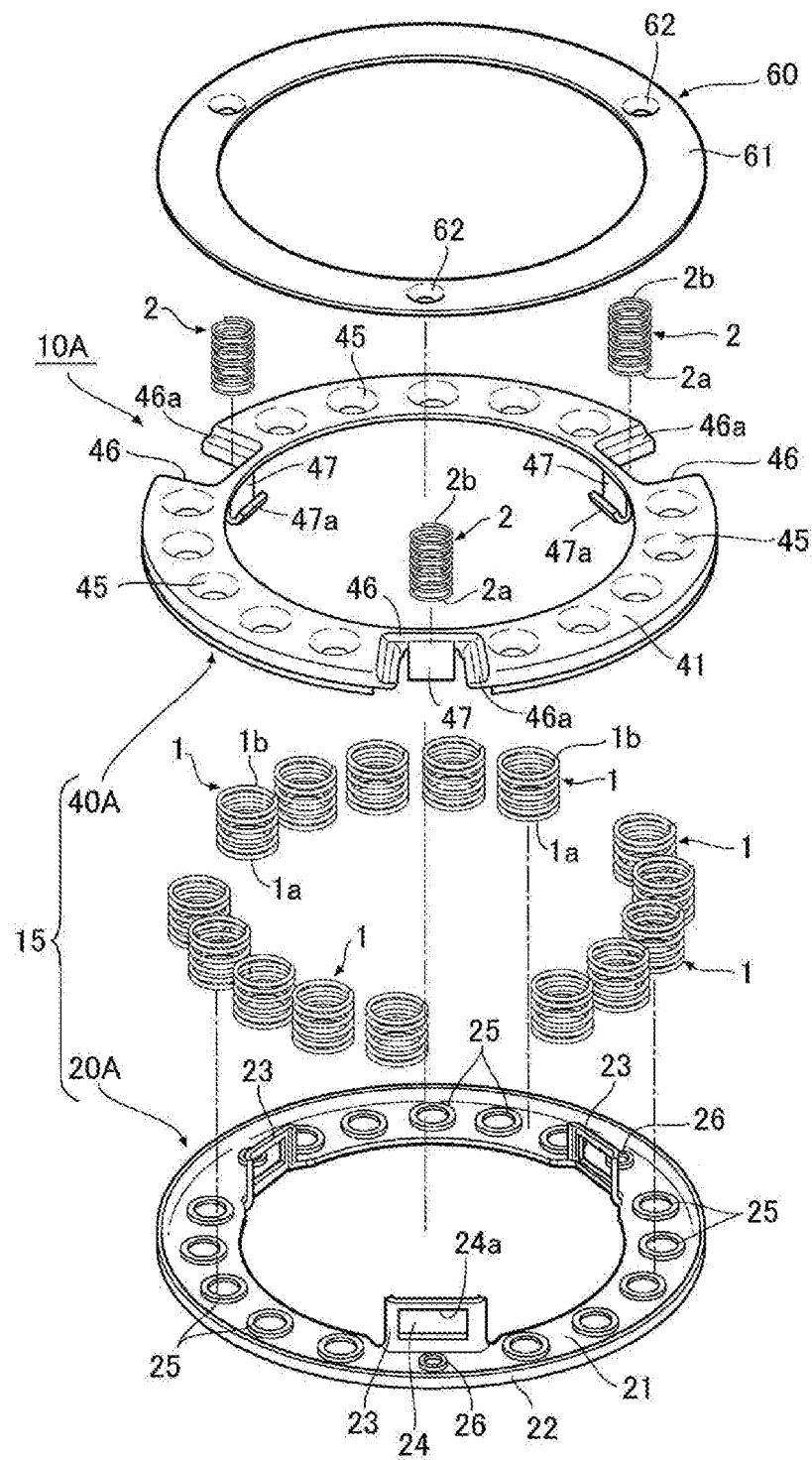
FIG. 7 is an exploded perspective view of a spring assembly according to a second embodiment of the present invention.

As illustrated in FIG. 7, a first support member 20A according to the second embodiment includes circular support protrusions 26 protruding toward the second support member 40A at positions corresponding to the plurality of holding walls 23 of the base plate 21. The support protrusions 26 are inserted into inner peripheries of the one ends 2a of the second coil springs 2 and tip ends thereof are crimped toward an outer radial direction, so that the one ends 2a of the second coil springs 2 are supported on a front surface of the base plate 21 (that is, the front surface of the first support member 20A) by the support protrusions 26 (see FIG. 9).

On the other hand, the second support member 40A includes a plurality of substantially U-shaped notches 46 formed by cutting an outer diameter side of the base plate 41 at equal intervals in the circumferential direction. The notches 46 include support step portions 46a on inner peripheries. The support step portions 46a may not be provided.

The notches 46 include holding pieces 47 extending toward the first support member 20A from peripheral edges thereof on an inner diameter side of the base plate 41. The holding pieces 47 may not extend from the peripheral edges of the notches 46. Tip end portions 47a of the holding pieces 47 are bent into a hook shape toward the inner diameter side of the base plate 41, which can be inserted into the slide holes 24 of the holding walls 23 and engaged with the inner peripheries 24a thereof (see FIGS. 9 to 11). That is, in the second embodiment, the slide holes 24 of the holding walls 23 of the first support member 20A and the tip end portions 47a of the holding pieces 47 of the second support member 40A constitute a "holding mechanism" provided between the first support member and the second support member in the present invention, which holds the plurality of first coil springs 1 in a compressed state. The tip end portions 47a of the holding pieces 47 may be bent into a hook shape toward an outer diameter side of the base plate 41.

Figure 8:
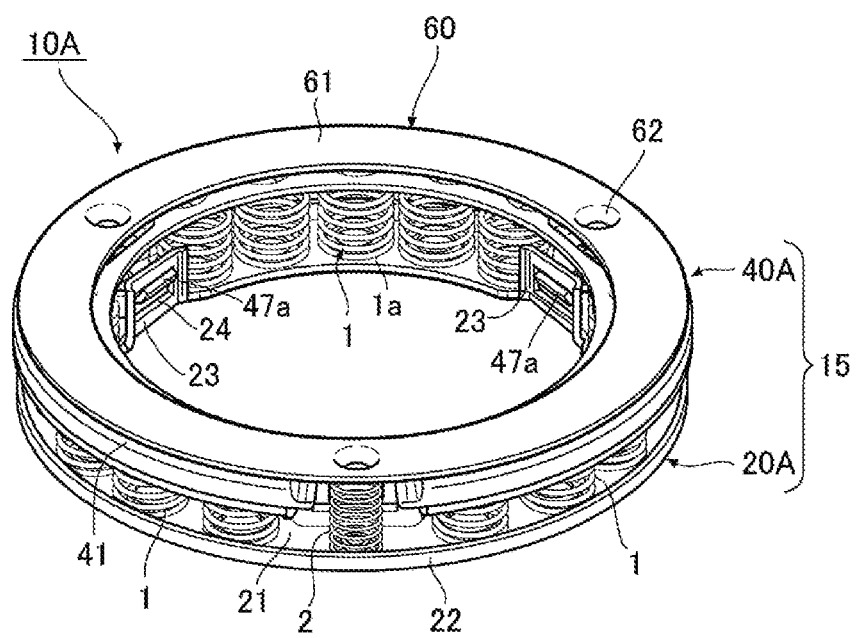
FIG. 8 is a perspective view of the spring assembly.

In the second embodiment, the one ends 1a of the plurality of first coil springs 1 are supported on the front surface of the base plate 21 of the first support member 20A, and the other ends 1b are supported on a back surface of the base plate 41 of the second support member 40A; the one ends 2a of the plurality of second coil springs 2 are supported on the front surface of the base plate 21 of the first support member 20A, and the other ends 2b are supported on a back surface of the pressing plate 60, thereby the spring assembly 10A being configured as illustrated in FIG. 8.

Next, operation and effects of the spring assembly 10A according to the second embodiment will be described.

Figure 12:
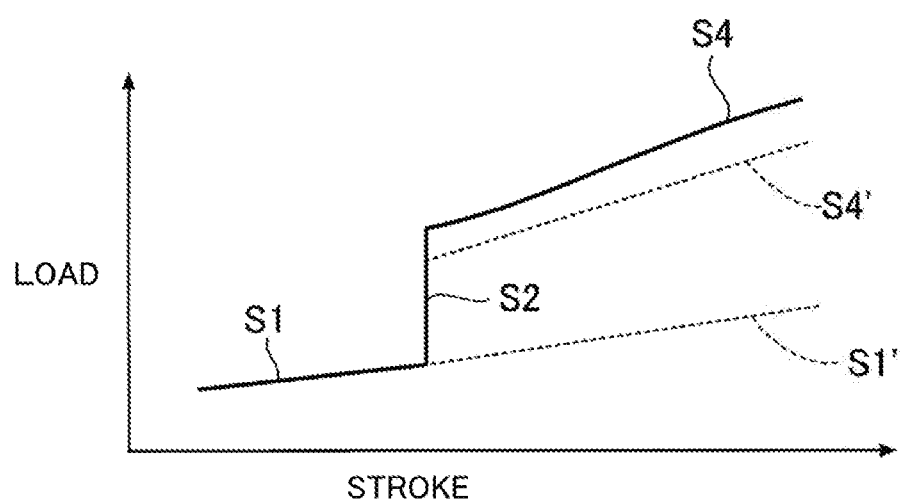
FIG. 12 is a graph showing a relationship between a spring stroke and a load of the spring assembly.
Figure 13:
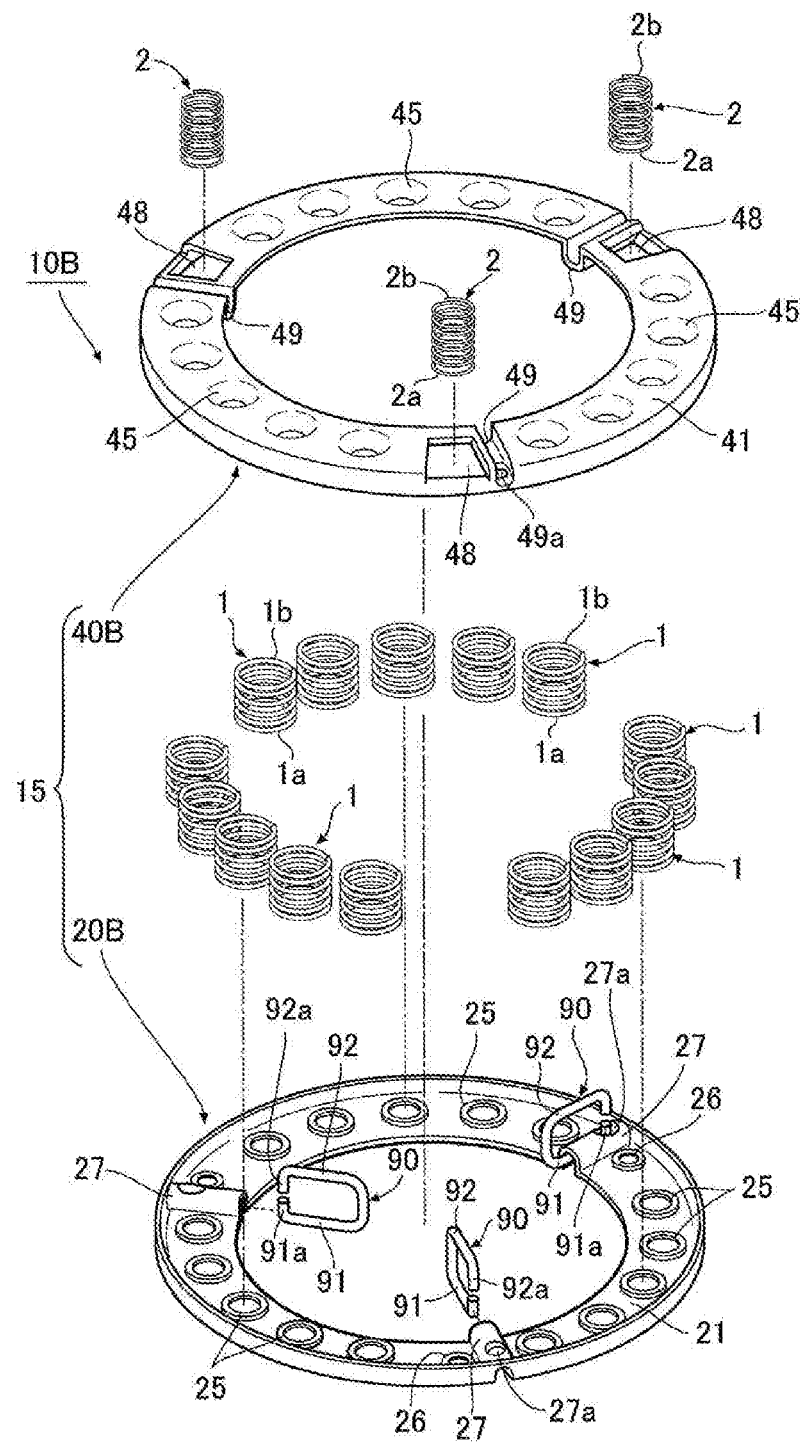
FIG. 13 is an exploded perspective view of a spring assembly according to a third embodiment of the present invention.

FIG. 12 illustrates a relationship between the stroke amount and a load of the coil springs of the spring assembly 10A according to the second embodiment. The relationship will be described with reference to FIG. 12.

Figure 9:
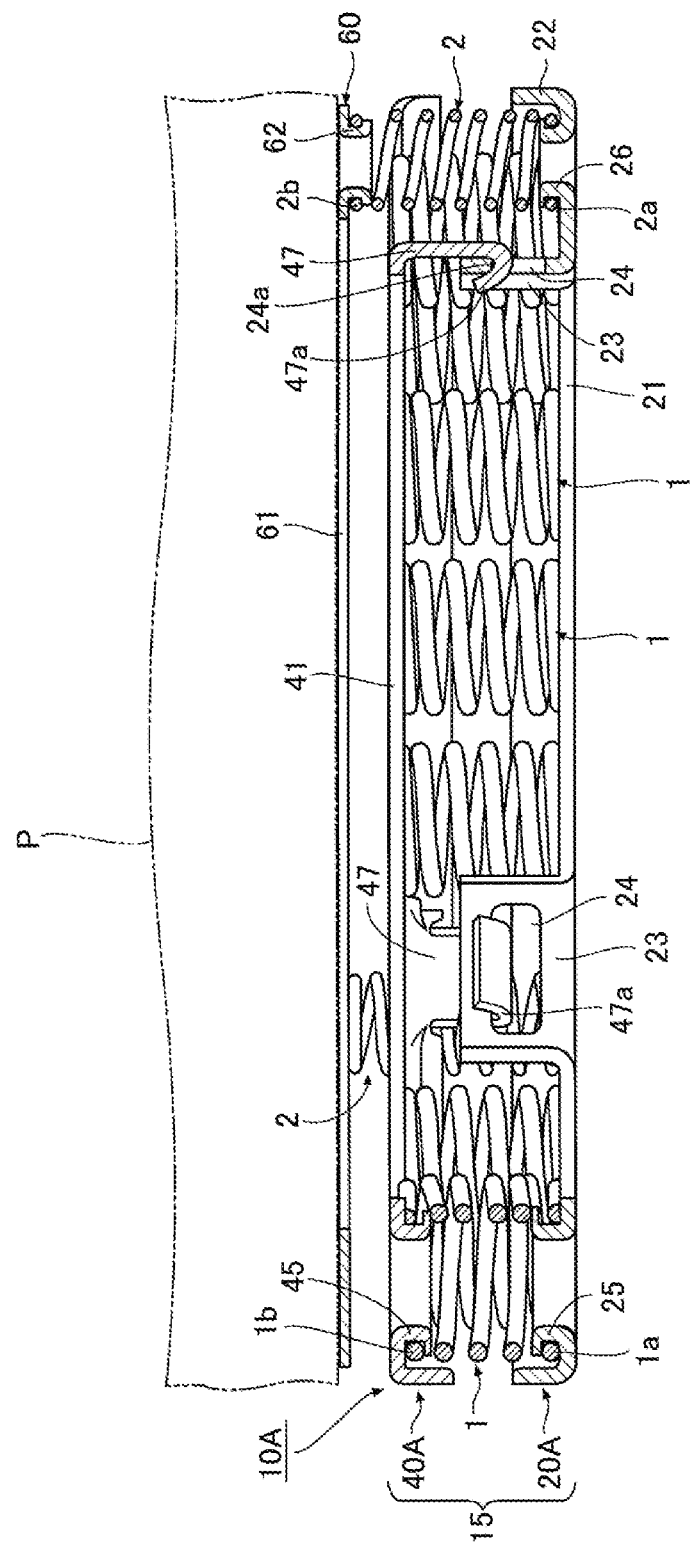
FIG. 9 is a cross-sectional view of the spring assembly.
Figure 10:
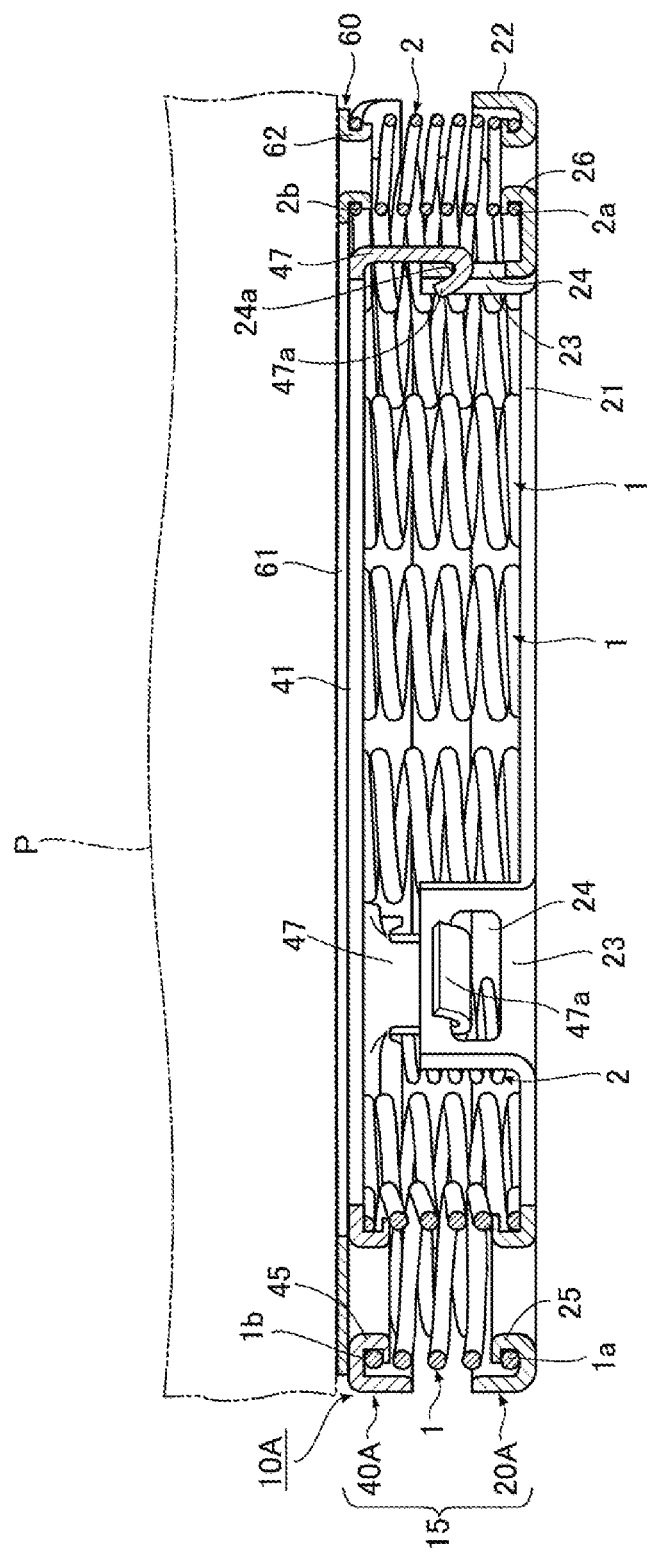
FIG. 10 is a cross-sectional view when a second support member is moved toward a first support member from the state in FIG. 9.
Figure 11:
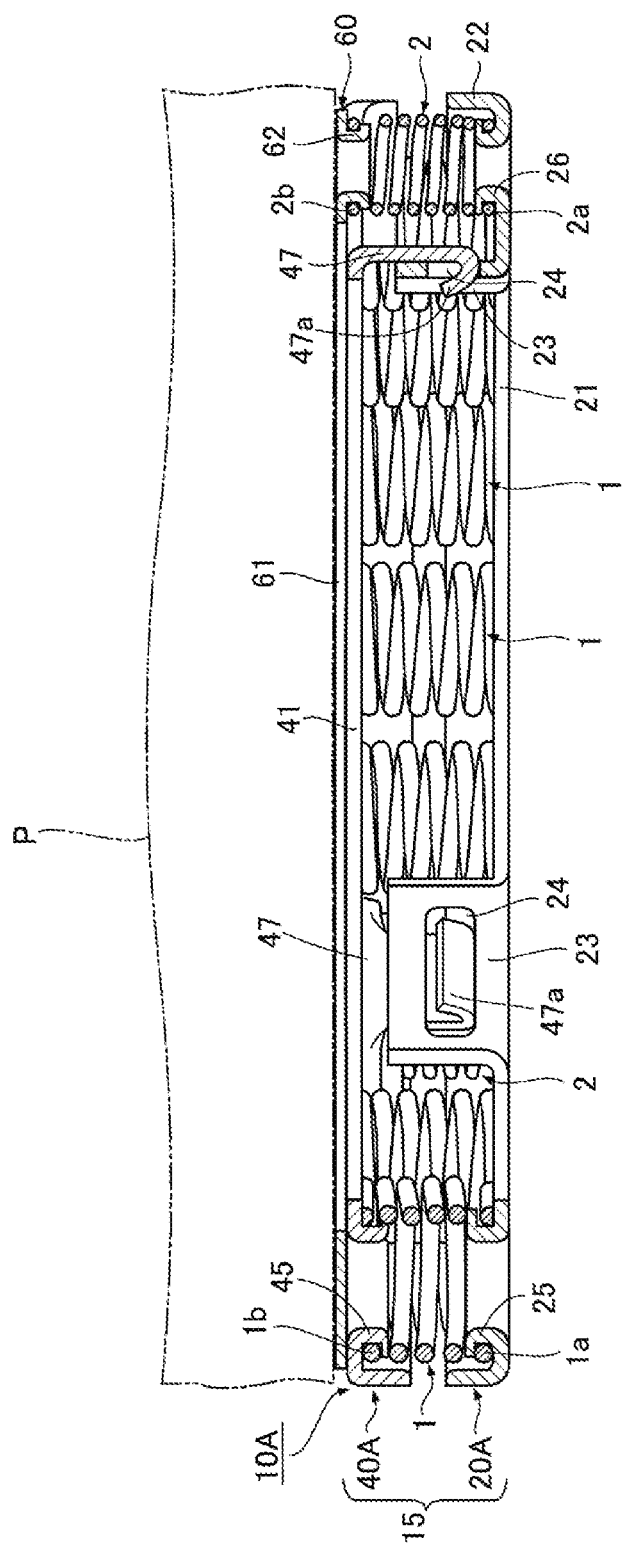
FIG. 11 is a cross-sectional view when the second support member is further moved toward the first support member from the state in FIG. 10.

When the pressing member P moves in a direction of approaching the first support member 20A from an initial state of a spring stroke illustrated in FIG. 9, the other ends 2b of the plurality of second coil springs 2 are compressed by the pressing plate 60, so that the load increases by elastic repulsive forces of the plurality of second coil springs 2 (see the reference numeral S1 in FIG. 12). When the pressing plate 60 abuts the second support member 40A, as illustrated in FIG. 10, the other ends 2b of the plurality of second coil springs 2 are compressed to a length of not protruding from the other ends 1b of the first coil springs 1, and the load rapidly increases by a load based on reaction from the second support member 40A. When the pressing member P further moves toward the first support member 20A, as illustrated in FIG. 11, the other ends 1b of the plurality of first coil springs 1 and the other ends 2b of the plurality of the second coil springs 2 are compressed by the second support member 40. At this time, in addition to a load caused by further compression of the plurality of second coil springs 2, a load caused by compression of the plurality of first coil springs 1 also acts to achieve a high load (see the reference numeral S4 in FIG. 12). The reference numeral S1' in FIG. 12 denotes a load characteristic of the plurality of second coil springs 2 alone, and a reference numeral S4' in FIG. 12 denotes a load characteristic of the plurality of first coil springs 1 alone.

Accordingly, in the spring assembly according to the second embodiment, at an initial stage of the spring stroke, a low load can be obtained due to only the elastic repulsive forces of the plurality of second coil springs 2 (see the reference numeral S1 in FIG. 12). At a later stage of the spring stroke when the stroke amount of the coil springs is large, a relatively high load can be obtained due to a sum of elastic repulsive forces of the plurality of first coil springs 1, which is larger than a sum of the elastic repulsive forces of the plurality of second coil springs 2, as well as the elastic repulsive forces of the plurality of second coil springs 2 (see the reference numeral S4 in FIG. 12). Accordingly, the spring assembly 10A can be obtained that has different load characteristics in two stages.

FIGS. 13 to 16 illustrate a spring assembly according to a third embodiment of the present invention. The same parts as those in the above embodiment are denoted by the same reference numerals, and descriptions thereof will be omitted.

A spring assembly 10B according to the third embodiment mainly differs from the first and the second embodiments in a structure of a holding mechanism that holds the plurality of first coil springs 1 in a compressed state.

That is, the spring assembly 10B includes substantially U-shaped holding members 90 including two side portions 91 and 92 that are parallel to each other. End portions 91a and 92a of the two side portions 91 and 92 are bent toward a direction close to each other.

A first support member 20B according to the third embodiment includes, on the base plate 21, substantially semi-tubular engagement tubular portions 27 opened on back sides thereof and on an inner diameter side of the base plate 21 at equal intervals in the circumferential direction. The engagement tubular portions 27 include insertion holes 27a.

On the other hand, the second support member 40B includes a plurality of openings 48 at equal intervals in the circumferential direction on the base plate 41. The base plate 41 includes, at positions adjacent to the openings 48, substantially semi-tubular engagement tubular portions 49 opened on a front side and the inner diameter side of the base plate 41, respectively. The engagement tubular portions 49 include insertion holes 49a.

Figure 14:
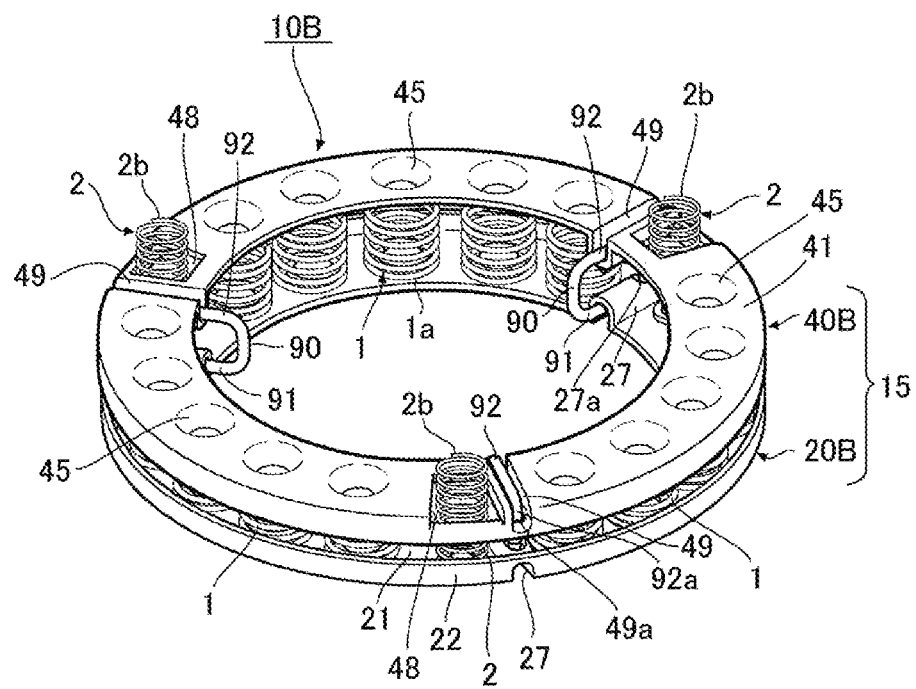
FIG. 14 is a perspective view of the spring assembly.
Figure 15:
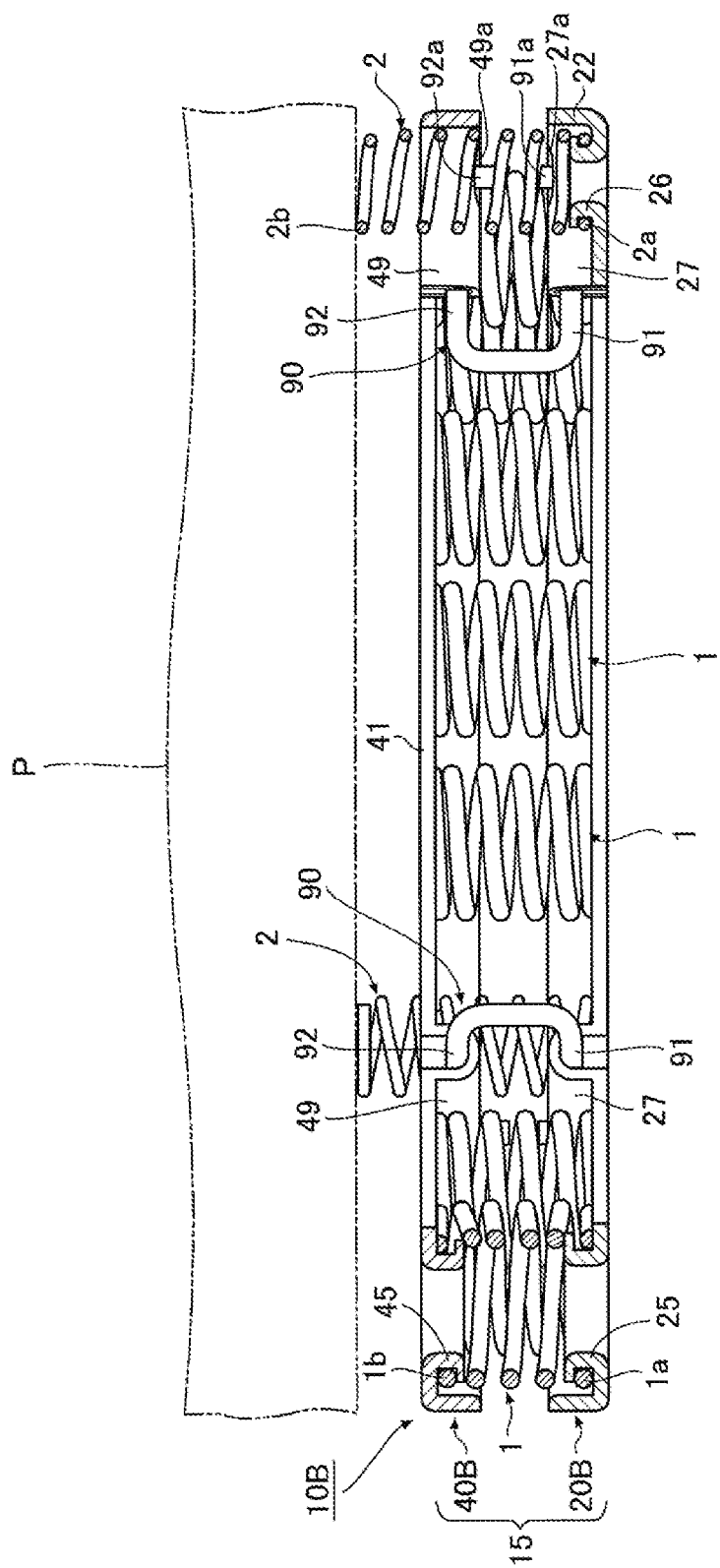
FIG. 15 is a cross-sectional view of the spring assembly.

When the plurality of first coil springs 1 are disposed between the first support member 20B and the second support member 40B, the engagement tubular portions 27 of the first support member 20B and the engagement tubular portions 49 of the second support member 40B are sandwiched by the holding members 90 from inner diameter sides of the first support member 20B and the second support member 40B. That is, the one side portions 91 of the holding members 90 are disposed in the engagement tubular portions 27 of the first support member 20B, and the one end portions 91a of the holding members 90 are inserted into the insertion holes 27a. The other side portions 92 of the holding members 90 are disposed in the engagement tubular portions 49 of the second support member 40B and the other end portions 92 of the holding members 90 are inserted into the insertion holes 49a. Accordingly, as illustrated in FIGS. 14 and 15, the one side portions 91 of the holding members 90 engage with inner peripheral surfaces of the engagement tubular portions 27, and the other side portions 92 of the holding members 90 engage with inner peripheral surfaces of the engagement tubular portions 49, so that the holding members 90 are assembled to the first support member 20B and the second support member 40B. Accordingly, the plurality of first coil springs 1 can be held in a compressed state.

That is, in the third embodiment, the holding members 90, the engagement tubular portions 27 of the first support member 20B, and the engagement tubular portions 49 of the second support member 40B constitute a "holding mechanism" in the present invention. Since the one end portions 91a of the holding members 90 are inserted into the insertion holes 27a of the engagement tubular portions 27 and the other end portions 92a of the holding members 90 are inserted into the insertion holes 49a of the engagement tubular portions 49, the holding members 90 can be prevented from coming off from the first support member 20B and the second support member 40B. Shapes of the engagement tubular portions 27 and 49 are not particularly limited (may not be substantially semi-tubular). The insertion holes 27a and 49a may not be holes but have such a shape that the one end portions 91a and the other end portions 92a of the holding members 90 can engage therewith and the holding members 90 can be prevented from coming off.

Figure 16:
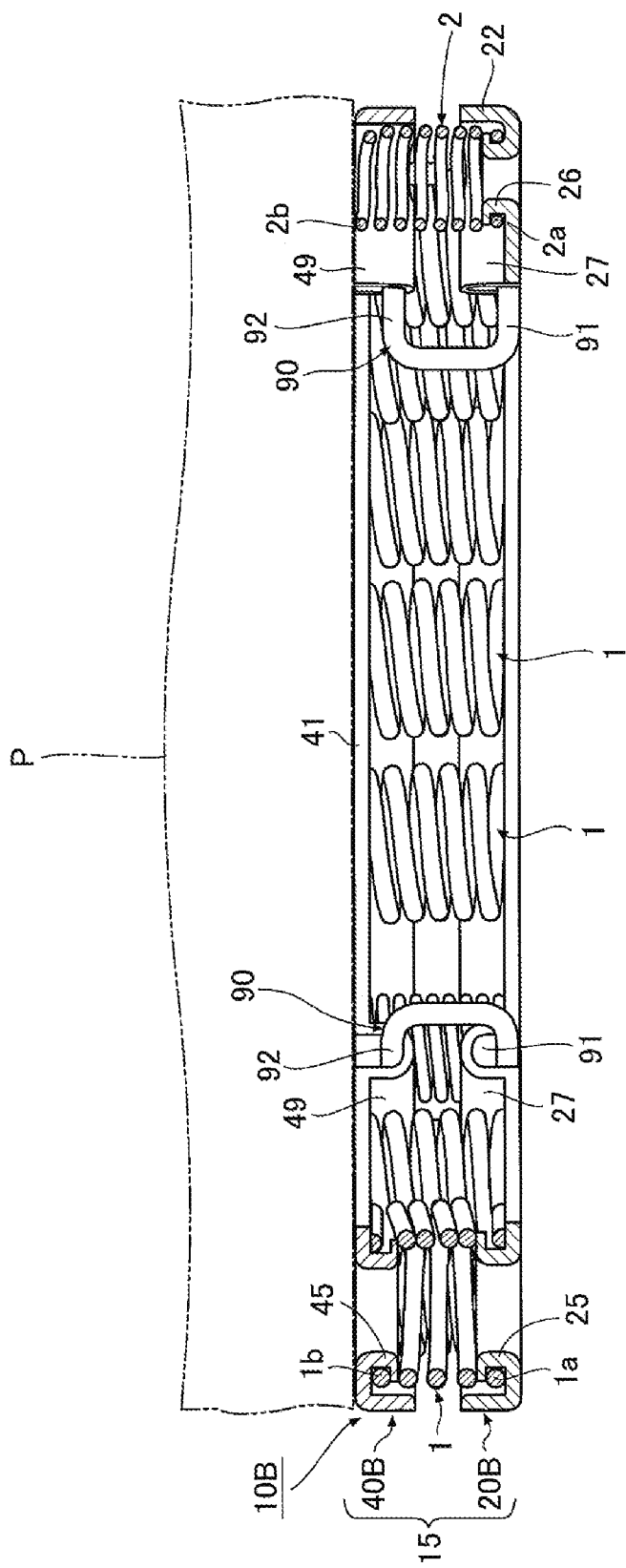
FIG. 16 is a cross-sectional view when a second support member is moved toward a first support member from the state in FIG. 15.
Figure 17:
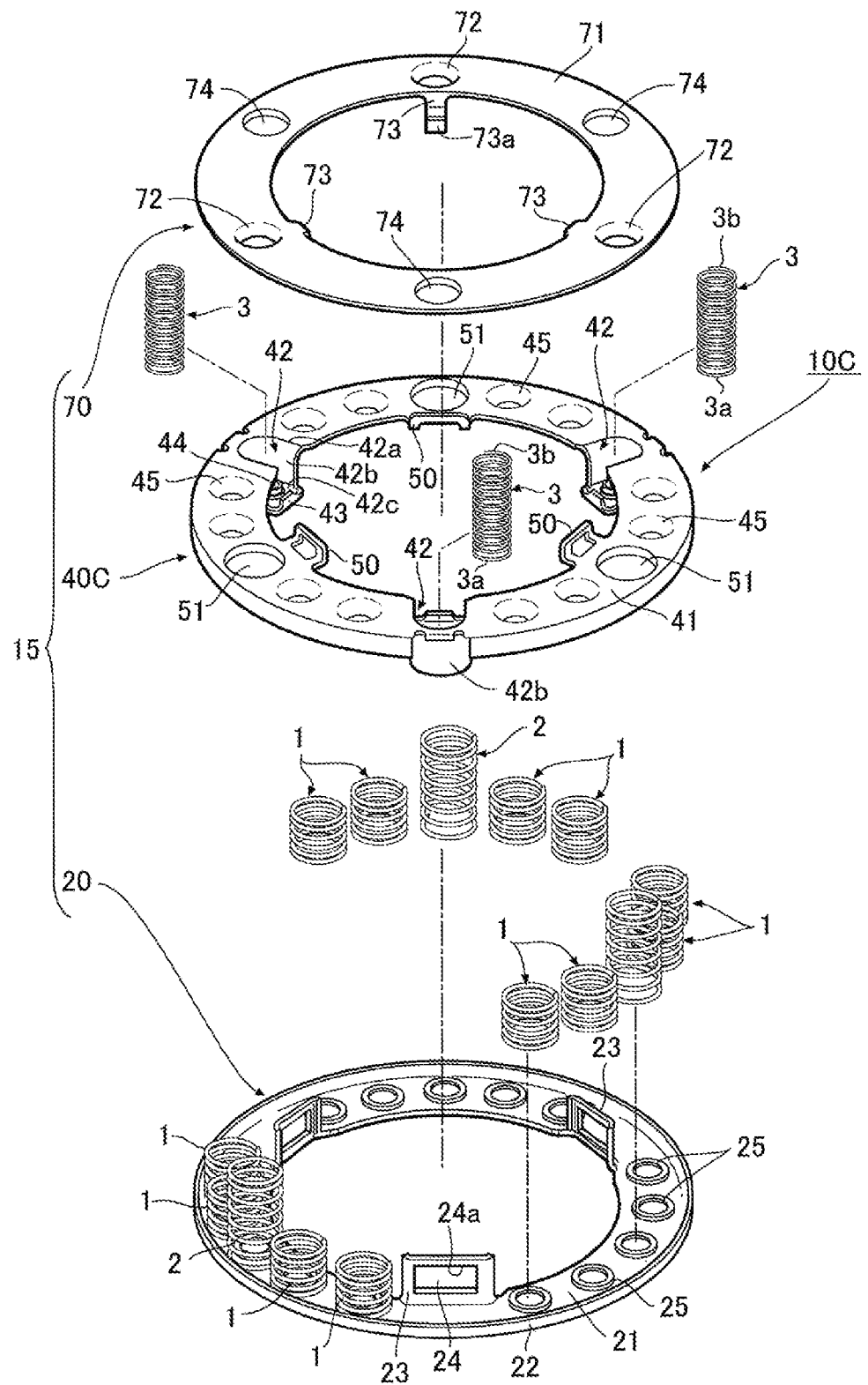
FIG. 17 is an exploded perspective view of a spring assembly according to a fourth embodiment of the present invention.
Figure 18:
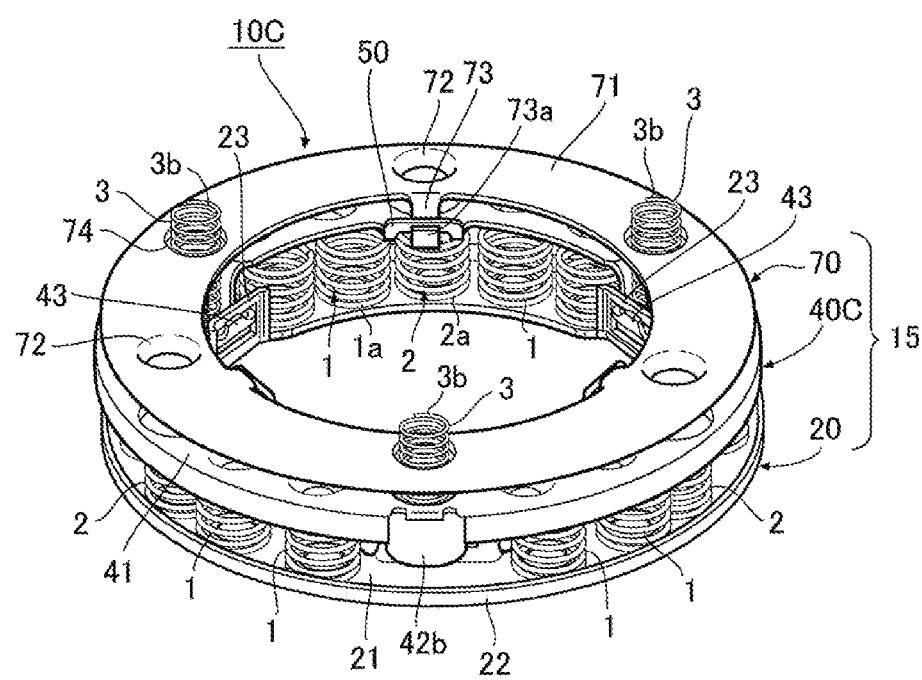
FIG. 18 is a perspective view of the spring assembly.

As illustrated in FIG. 16, in a later stage of a spring stroke when the first coil springs 1 and the second coil springs 2 are compressed due to the pressing member P, the one side portions 91 of the holding members 90 are separated from the inner peripheral surfaces of the engagement tubular portions 27.

FIGS. 17 to 21 illustrate a spring assembly according to a fourth embodiment of the present invention. The same parts as those in the above embodiment are denoted by the same reference numerals, and descriptions thereof will be omitted.

A spring assembly 10C according to the fourth embodiment differs from the first to third embodiments in having different load characteristics in three stages. That is, the spring assembly 10C according to the fourth embodiment further includes a plurality of third coil springs 3 (herein three). The fourth embodiment basically follows the structure in the first embodiment (see FIGS. 1 to 6) and has a structure including a third support member 70.

The one ends 2a of the plurality of second coil springs 2 are supported on a front surface of the base plate 21 of the first support member 20 by the support protrusions 25 provided on the first support member 20.

A second support member 40C disposed to face the first support member 20 includes a plurality of holding walls 50 on a peripheral edge of the base plate 41 on an inner diameter side. In the fourth embodiment, three holding walls 50 are provided at equal intervals in the circumferential direction on the peripheral edge of the base plate 41 on the inner diameter side. The holding walls 50 are displaced by 60° in the circumferential direction relative to the three recesses 42 provided on the base plate 41. The holding walls 50 have a substantially L-shaped frame shape with their tip ends bent toward the third support member 70. Further, the base plate 41 includes spring insertion holes 51, through which the second coil springs 2 are inserted, in positions corresponding to the holding walls 50. One ends 3a of the plurality of third coil springs 3 are supported on front surfaces of the bottom walls 42c by the support protrusions 44 provided on the bottom walls 42c of the recesses 42 (see FIG. 19).

The third support member 70 is disposed to face the second support member 40C and includes an annular-shaped base plate 71 that corresponds to the base plate 41 of the second support member 40C. The base plate 71 includes a plurality of circular support protrusions 72 protruding toward the second support member 40C at equal intervals in the circumferential direction. The other ends 2b of the second coil springs 2 are inserted through the spring insertion holes 51 and are supported on a back surface of the base plate 71 by the support protrusions 72 (see FIG. 19).

Holding pieces 73 extend toward the second support member 40C in positions corresponding to the supporting protrusions 72 on a peripheral edge of the base plate 71 on an inner diameter side. Tip end portions 73a of the holding pieces 73 are bent into a hook shape toward the inner diameter side of the base plate 71 and engage with inner peripheries of the holding walls 50 of the second support member 40C (see FIGS. 19 to 21). The tip end portions 73a of the holding pieces 73 may be bent toward an outer diameter side of the base plate 71 and engage with outer peripheries of the holding walls 50. In this manner, since the tip end portions 73a of the holding pieces 73 engage with the inner peripheries of the holding walls 50 of the second support member 40C, the plurality of second coil springs 2 are held in a compressed state, and the third support member 70 is assembled not to come off from the second support member 40C. Further, the base plate 71 includes spring insertion holes 74, through which the third coil springs 3 are inserted, between the support protrusions 72.

According to the spring assembly 10C in the fourth embodiment described above, the one ends 1a of the plurality of first coil springs 1 are supported on the front surface of the base plate 21 of the first support member 20A, and the other ends 1b are supported on a back surface of the base plate 41 of the second support member 40C; the one ends 2a of the plurality of second coil springs 2 are supported on the front surface of the base plate 21 of the first support member 20A, and the other ends 2b are supported on the back surface of the base plate 71; and the one ends 3a of the plurality of third coil springs 3 are supported on the front surfaces of the bottom walls 42c of the recesses 42 of the second support member 40C, and the other ends 3b are pressed against the pressing member P. The other ends 2b of the plurality of second coil springs 2 protrude further than the other ends 1b of the plurality of first coil springs 1, and the other ends 3b of the plurality of third coil springs 3 protrude further than the other ends 2b of the plurality of second coil springs 2 (see FIG. 19).

Figure 20:
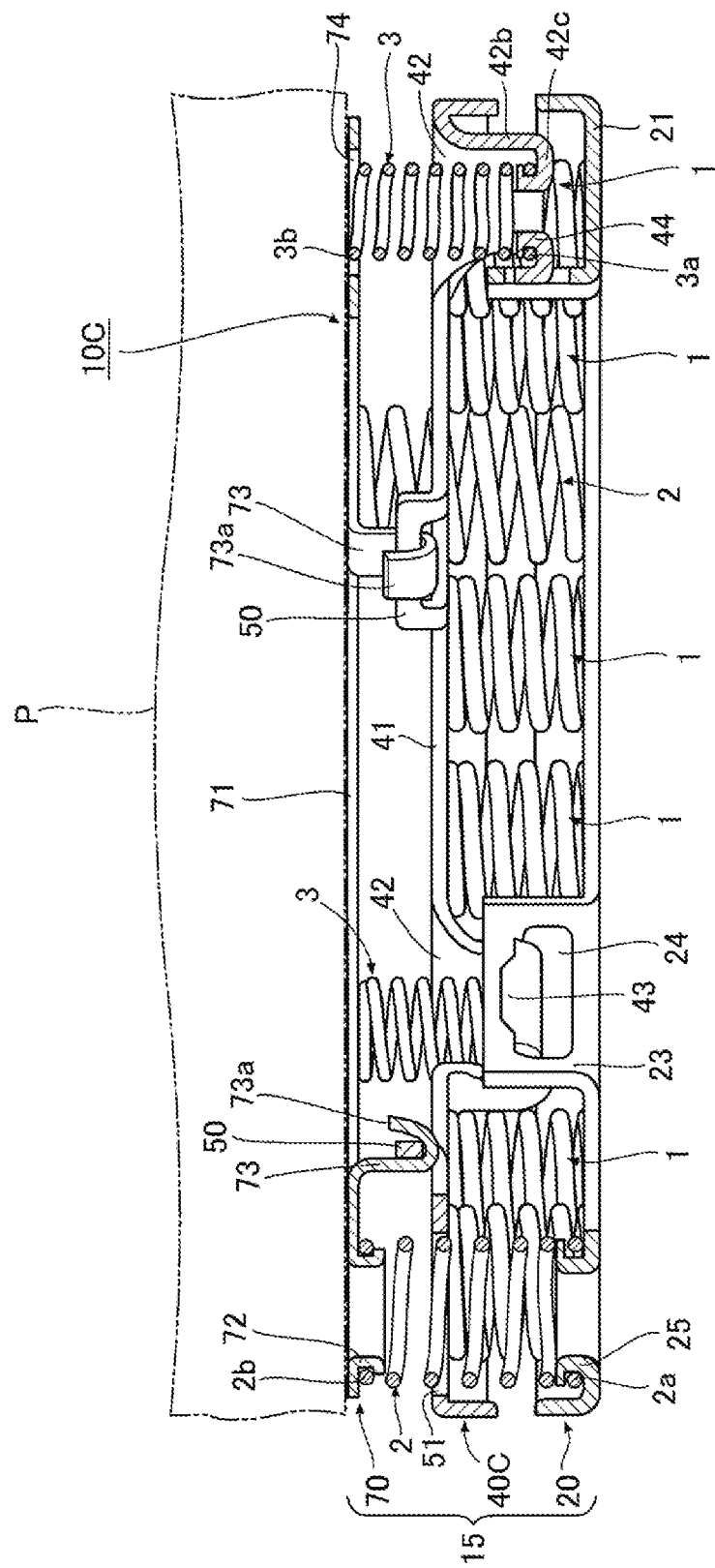
FIG. 20 is a cross-sectional view when a third support member is moved toward a first support member from the state in FIG. 19.
Figure 21:
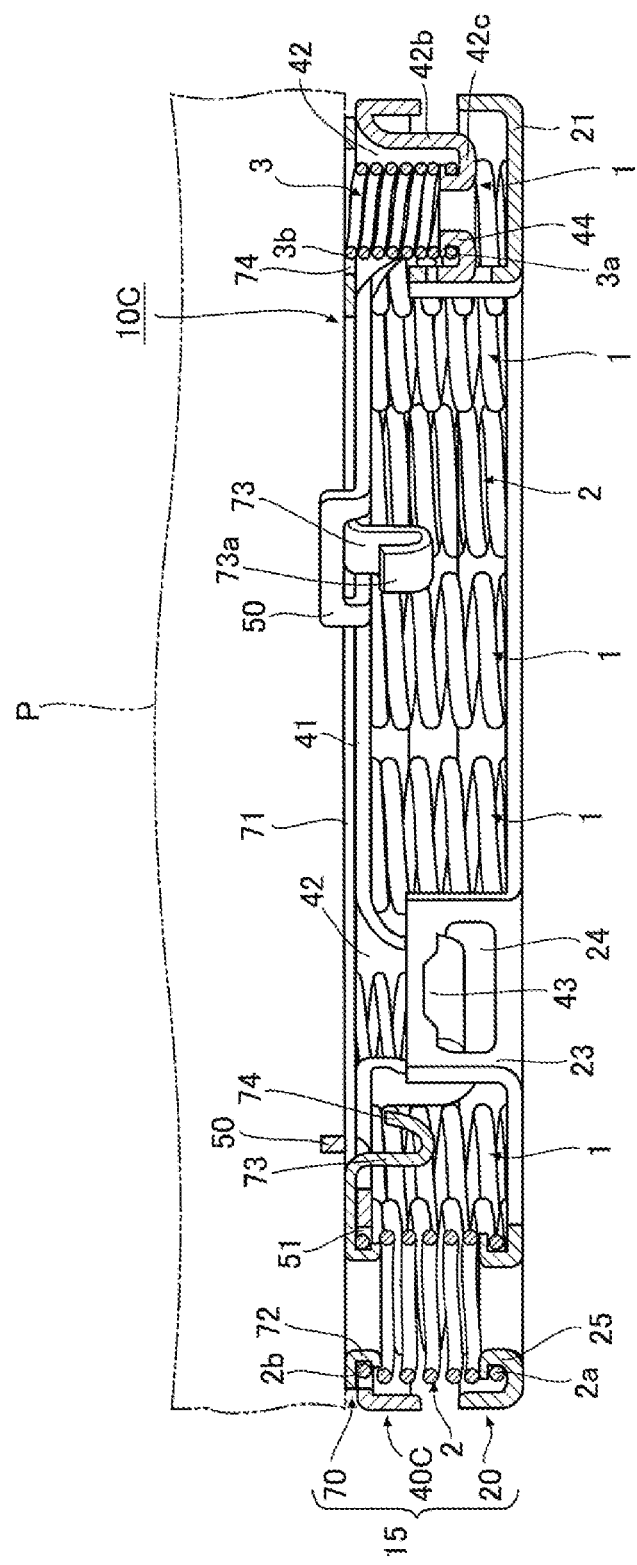
FIG. 21 is a cross-sectional view when the third support member is further moved toward the first support member from the state in FIG. 20.

In the spring assembly 10C, as illustrated in FIG. 21, in a state where the plurality of second coil springs 2 are compressed to a length at which the other ends 2b do not protrude from the other ends 1b of the plurality of first coil springs 1, and also the plurality of first coil springs 1 are compressed, a sum of elastic repulsive forces of the plurality of first coil springs 1 is larger than a sum of elastic repulsive forces of the plurality of second coil springs 2. Further, as illustrated in FIG. 20, in a state where the plurality of third coil springs 3 are compressed to a length at which the other ends 3b do not protrude from the other ends 2b of the plurality of second coil springs 2, and also the plurality of second coil springs 2 are compressed, the sum of the elastic repulsive forces of the plurality of second coil springs 2 is larger than a sum of elastic repulsive forces of the plurality of the third coil springs 3.

Figure 19:
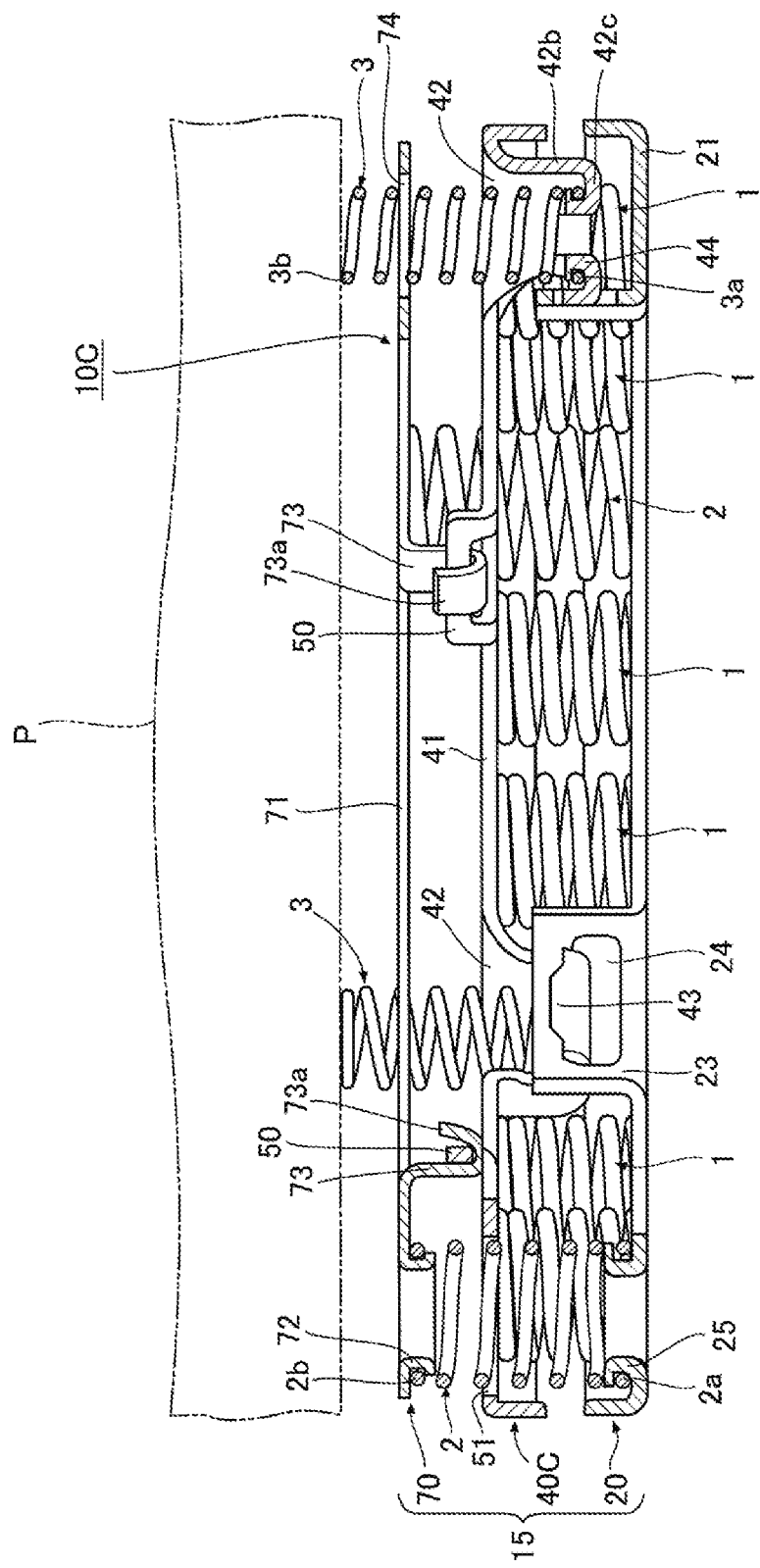
FIG. 19 is a cross-sectional view of the spring assembly.

In the spring assembly 10C, when the pressing member P moves in a direction of approaching the first support member 20 from an initial state of the spring stroke illustrated in FIG. 19, the other ends 3b of the plurality of third coil springs 3 are compressed first. As illustrated in FIG. 20, when the pressing member P abuts the third support member 70, the other ends 3b of the plurality of third coil springs 3 are compressed to a length of not protruding from the other ends 2b of the second coil springs 2. When the pressing member P further moves toward the first support member 20, as illustrated in FIG. 21, the third support member 70 abuts the second support member 40C, and the second coil springs 2 and the first coil springs 1 are compressed while the compression of the third coil springs 3 is restricted.

Therefore, a load by the plurality of third coil springs 3 can be obtained in an initial stage of the spring stroke (as illustrated in FIGS. 19 to 20), a load by the plurality of third coil springs 3 and the plurality of second coil springs 2 can be obtained in an intermediate stage of the spring stroke (as illustrated in FIGS. 20 to 21), and a constant load by the plurality of third coil springs 3, a load by the plurality of second coil springs 2 and a load by the plurality of first coil springs 1 can be obtained in a later stage of the spring stroke (after FIG. 21). Accordingly, different load characteristics in three stages can be obtained.

FIGS. 22 to 26 illustrate a spring assembly according to a fifth embodiment of the present invention. The same parts as those in the above embodiment are denoted by the same reference numerals, and descriptions thereof will be omitted.

Similarly to the fourth embodiment, a spring assembly 10D according to the fifth embodiment has different load characteristics in three stages. The fifth embodiment basically follows the structure in the second embodiment (see FIGS. 7 to 12).

The base plate 21 of a first support member 20D includes a plurality of frame-shaped holding walls 29 on an peripheral edge on an inner diameter side. In the fifth embodiment, three holding walls 29 are provided at equal intervals in the circumferential direction on the peripheral edge of the base plate 21 on the inner diameter side, and the holding walls 29 are displaced by 60° in the circumferential direction relative to the three holding walls 23 provided on the base plate 21. The one ends 1a of the plurality of first coil springs 1, the one ends 2a of the plurality of second coil springs 2, and one ends 3a of the plurality of third coil springs 3 are supported on a front surface of the base plate 21 by the support protrusions 25 and 26. The plurality of second coil springs 2 are supported by the support protrusions 25 at positions corresponding to the holding walls 29, and the plurality of third coil springs 3 are supported by the support protrusions 26 at positions corresponding to the holding walls 23.

Figure 22:
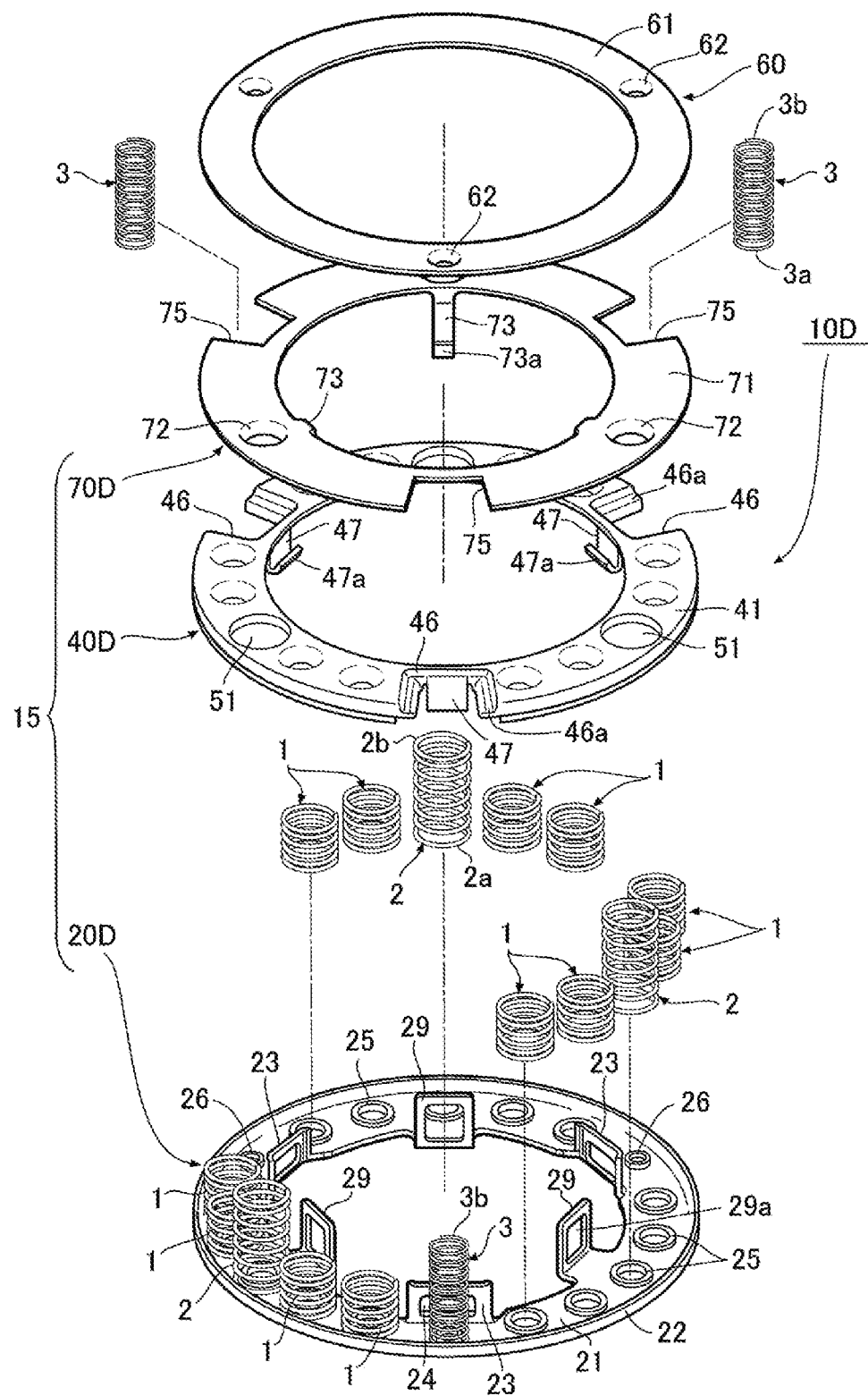
FIG. 22 is an exploded perspective view of a spring assembly according to a fifth embodiment of the present invention.
Figure 23:
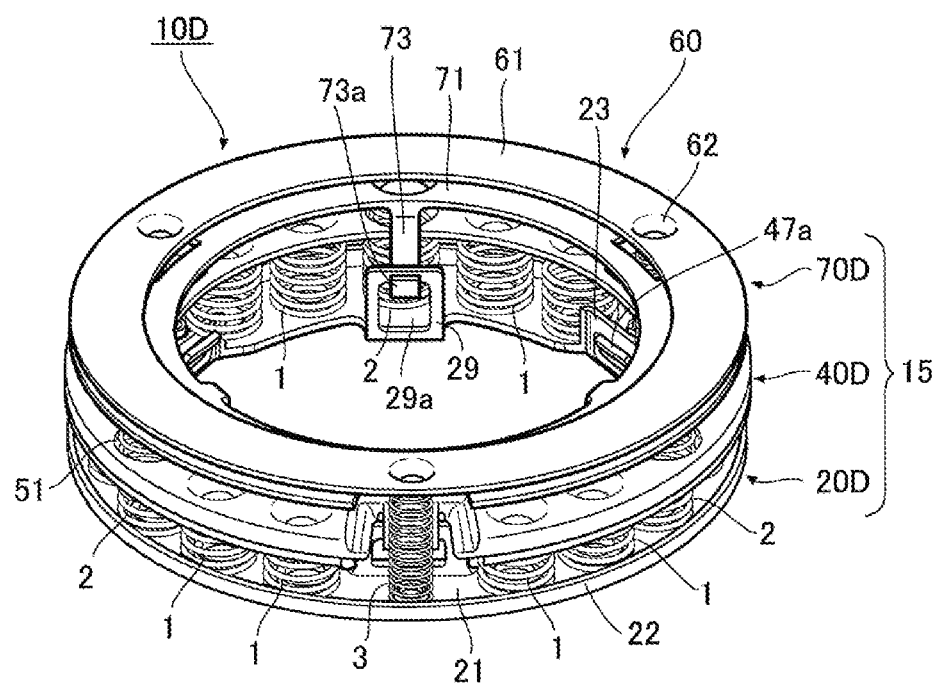
FIG. 23 is a perspective view of the spring assembly.

The base plate 41 of a second support member 40D includes the spring insertion holes 51, through which the second coil springs 2 are inserted, in positions corresponding to the holding walls 29 of the first support member 20D (see FIG. 22).

The base plate 71 of the third support member 70D includes notches 75, through which the plurality of third coil springs 3 pass, in positions corresponding to the holding walls 23 of the first support member 20D. Since the holding pieces 73 are provided in positions of the base plate 71 corresponding to the holding walls 29 of the first support member 20D and the tip end portions 73*a* engage with slide holes 29*a* of the holding walls 29, the plurality of second coil springs 2 are held in a compressed state, and the third support member 70D is assembled not to come off from the second support member 40D (see FIG. 24). The other ends 3*b* of the plurality of third coil springs 3 are supported on a back surface of the pressing plate 60 by the support protrusions 62 provided on the pressing plate 60 (see FIG. 24).

Figure 24:
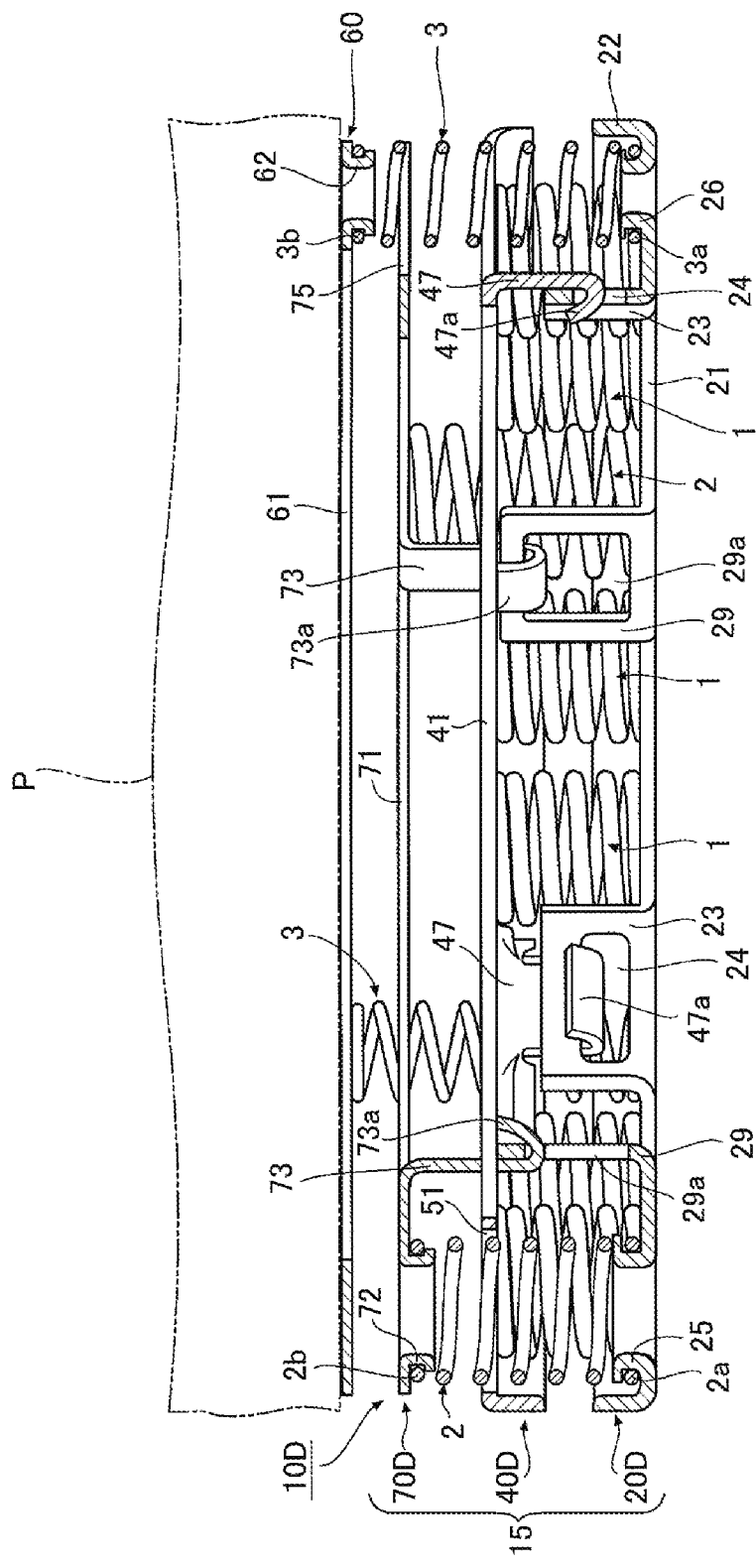
FIG. 24 is a cross-sectional view of the spring assembly.
Figure 25:
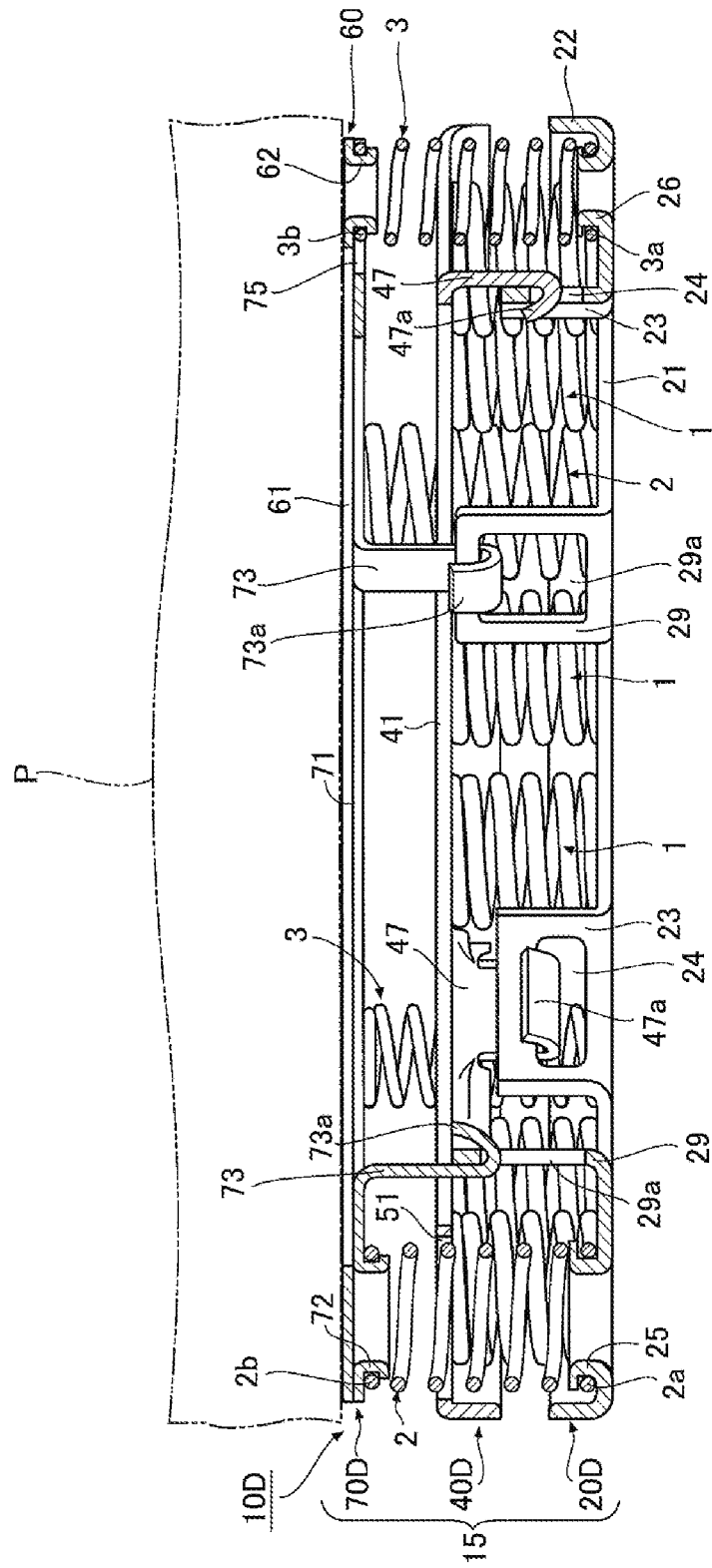
FIG. 25 is a cross-sectional view when a third support member is moved toward a first support member from the state in FIG. 24.
Figure 26:
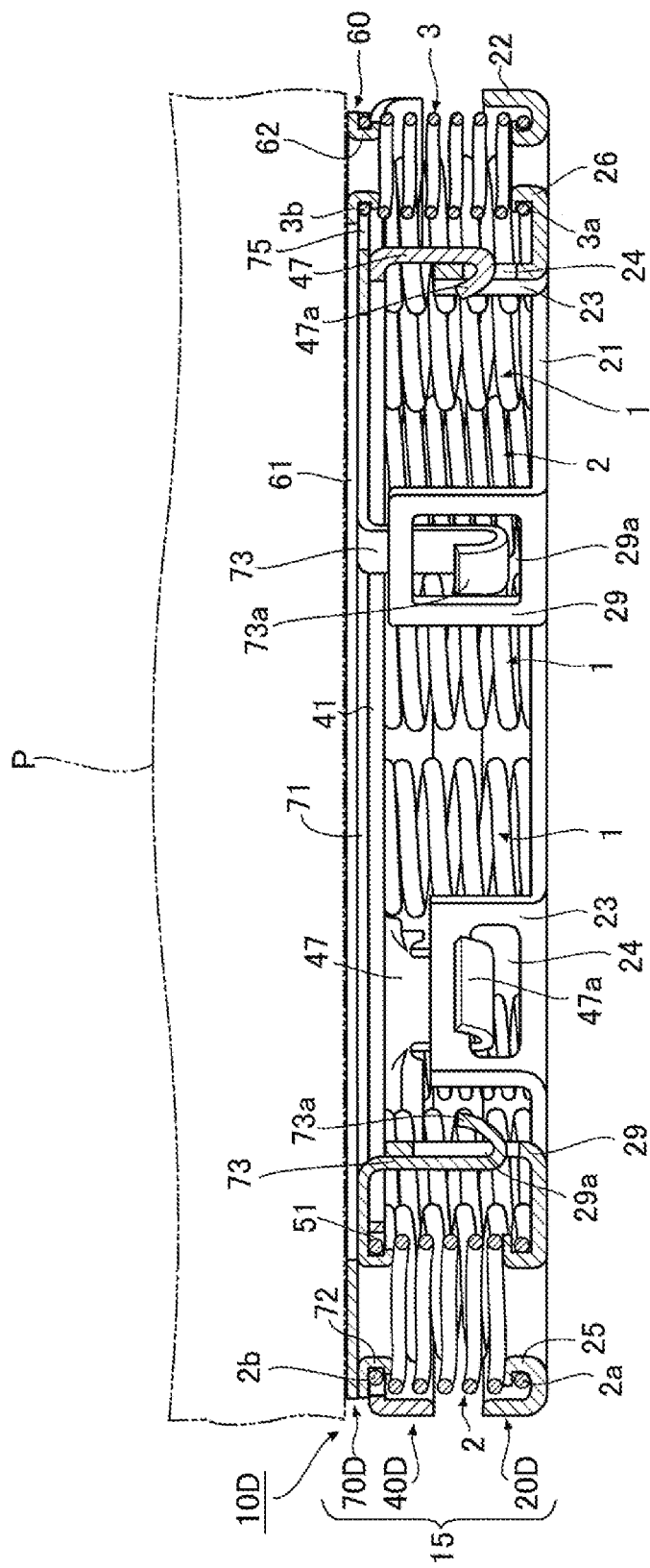
FIG. 26 is a cross-sectional view when the third support member is further moved toward the first support member from the state in FIG. 25.

In the spring assembly 10D, when the pressing member P moves in a direction of approaching the first support member 20D from an initial state of the spring stroke illustrated in FIG. 24, the other ends 3*b* of the plurality of third coil springs 3 are compressed by the pressing plate 60 first. When the pressing plate 60 abuts the third support member 70, the other ends 3*b* of the plurality of third coil springs 3 are compressed to a length of not protruding from the other ends 2*b* of the second coil springs 2 (see FIG. 25). When the pressing member P further moves toward the first support member 20D, as illustrated in FIG. 26, the third support member 70D abuts the second support member 40D and the first coil springs 1 are compressed. That is, a load by the plurality of third coil springs 3 can be obtained in an initial stage of the spring stroke (as illustrated in FIGS. 24 and 25), a load by the plurality of third coil springs 3 and the plurality of second coil springs 2 can be obtained in an intermediate stage of the spring stroke (as illustrated in FIGS. 25 and 26), and a load by the plurality of third coil springs 3, the plurality of second coil springs 2, and the plurality of first coil springs 1 can be obtained in a later stage of the spring stroke (since FIG. 26). Accordingly, different load characteristics in three stages can be obtained.

Figure 27:
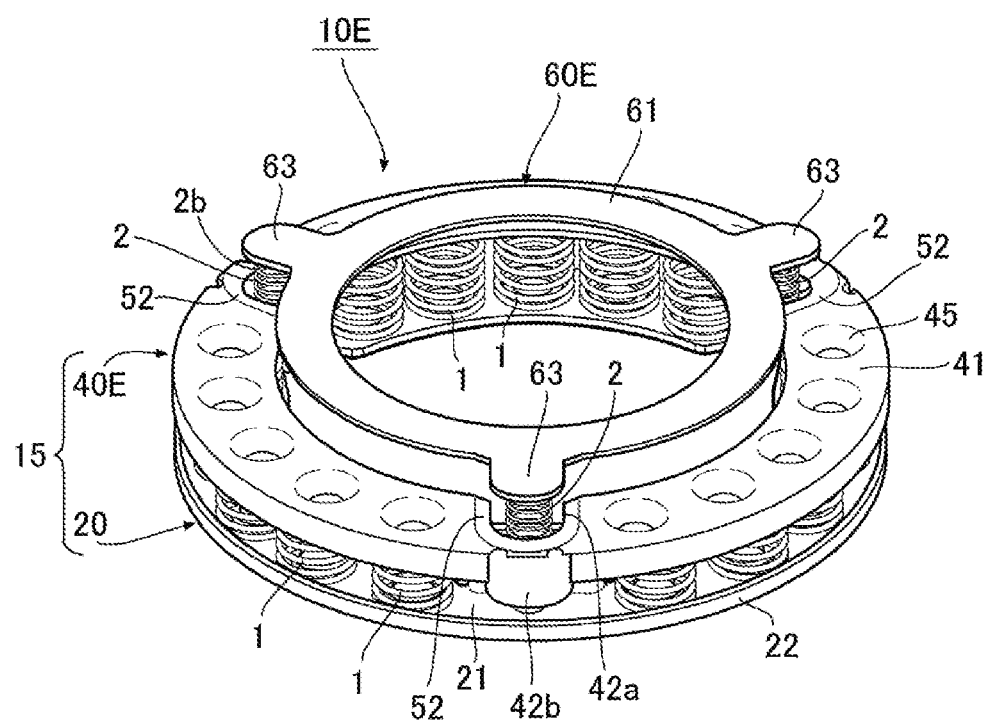
FIG. 27 is a perspective view of a spring assembly according to a sixth embodiment of the present invention.
Figure 28:
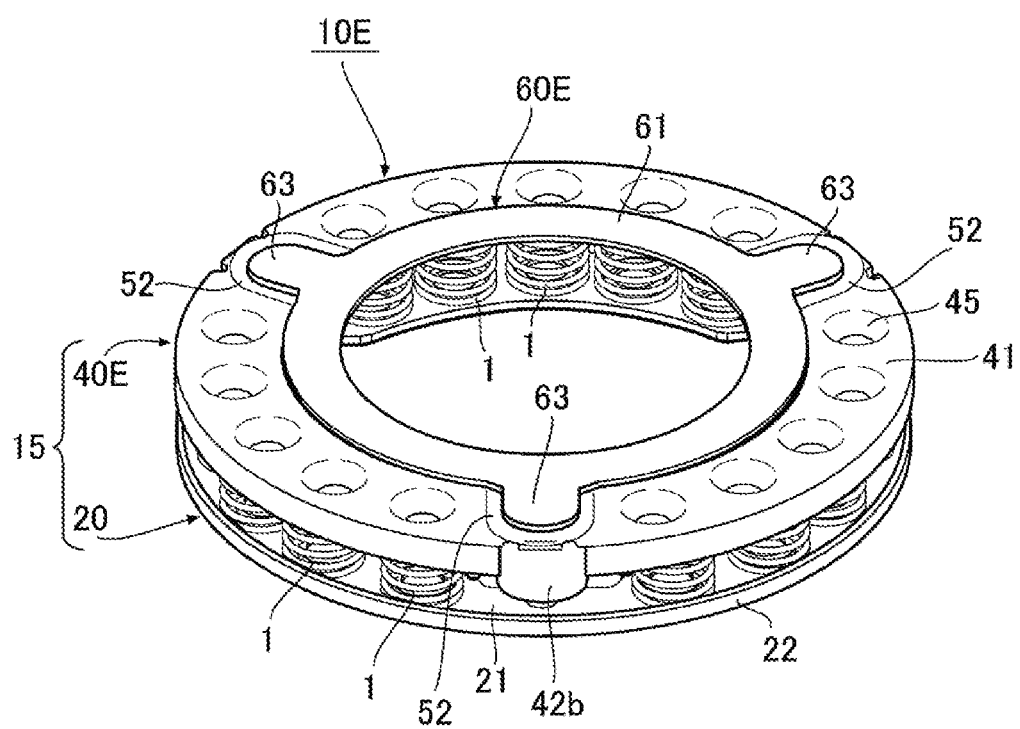
FIG. 28 is a perspective view of the spring assembly when a pressing plate is pressed.

FIGS. 27 and 28 illustrate a spring assembly according to a sixth embodiment of the present invention. The same parts as those in the above embodiment are denoted by the same reference numerals, and descriptions thereof will be omitted.

A spring assembly 10E according to the sixth embodiment mainly differs from the above embodiments in a structure of a pressing plate 60E. The sixth embodiment basically follows the structure in the first embodiment (see FIGS. 1 to 6).

A second support member 40E in the sixth embodiment includes receiving recesses 52 on inner peripheries of the plurality of substantially U-shaped notches 42*a*. On the other hand, the pressing plate 60E includes the annular base plate 61 having an outer diameter that corresponds to an inner diameter of the base plate 41 of the second support member 40E. Belt-shaped support pieces 63, which enter the receiving recesses 52 when the pressing plate 60E is pressed toward the second support member 40E, protrude further than a peripheral edge of the base plate 61 on an outer diameter side. The other ends 2*b* of the second coil springs 2 are supported on back surfaces of the support pieces 63.

In the sixth embodiment, when the pressing plate 60E is pressed by the pressing member P from the state in FIG. 27, as illustrated in FIG. 28, the base plate 61 of the pressing plate 60E enters an inner diameter side of the base plate 41 of the second support member 40E, and the plurality of support pieces 63 of the pressing plate 60E respectively enter the plurality of receiving recesses 52 of the second support member 40E. Accordingly, the pressing plate 60E overlaps the second support member 40E in the thickness direction and the thickness of the spring assembly 10E can be reduced by the thickness of the pressing plate 60E. The second coil springs 2 can be further compressed by the thickness of the pressing plate 60E.

Figure 29:
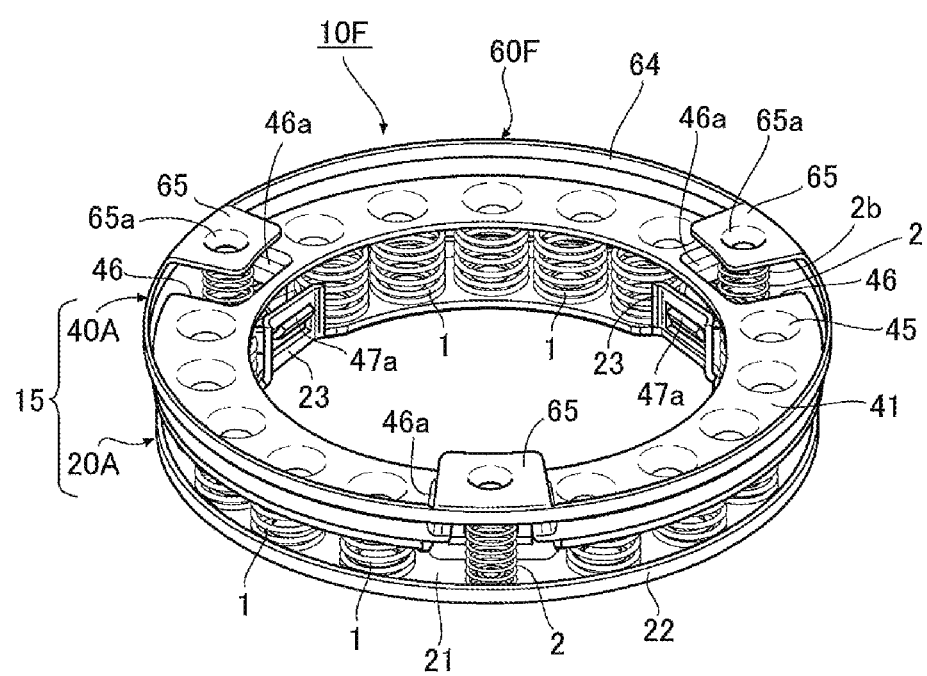
FIG. 29 is a perspective view of a spring assembly according to a seventh embodiment of the present invention.
Figure 30:
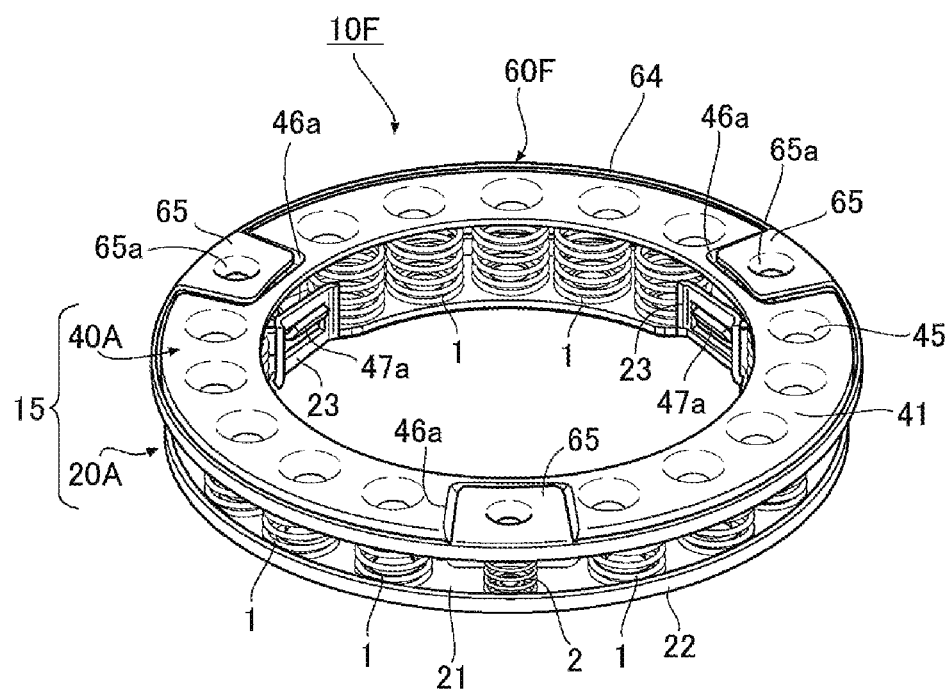
FIG. 30 is a perspective view of the spring assembly when a pressing plate is pressed.

FIGS. 29 and 30 illustrate a spring assembly according to a seventh embodiment of the present invention. The same parts as those in the above embodiment are denoted by the same reference numerals, and descriptions thereof will be omitted.

Similarly to the sixth embodiment, a spring assembly 10F according to the seventh embodiment mainly differs from the above embodiments in a structure of a pressing plate 60E The seventh embodiment basically follows the structure in the second embodiment (see FIGS. 7 to 12).

As described above, the second support member 40A in the seventh embodiment includes a plurality of support step portions 46*a* in inner peripheries of the notches 46. On the other hand, the pressing plate 60F includes an annular frame-shaped wall 64 having an inner diameter that corresponds to an outer diameter of the base plate 41 of the second support member 40A and support pieces 65 protruding from an inner periphery of the frame-shaped wall 64. The support pieces 65 enter the support step portions 46*a* of the second support member 40A. The other ends 2*b* of the second coil springs 2 are supported on back surfaces of the support pieces 65 by the support pieces 65.

In the seventh embodiment, when the pressing plate 60F is pressed by the pressing member P from the state in FIG. 29, as illustrated in FIG. 30, the frame-shaped wall 64 of the pressing plate 60F is disposed on an outer diameter side of the base plate 41 of the second support member 40A, and the plurality of support pieces 65 of the pressing plate 60F enter and are supported on the plurality of support step portions 46*a* of the second support member 40A. Accordingly, the pressing plate 60F overlaps the second support member 40A in the thickness direction and the thickness of the spring assembly 10F can be reduced by the thickness of the pressing plate 60F. The second coil springs 2 can be further compressed by the thickness of the pressing plate 60F. The frame-shaped wall 64 of the pressing plate 60F may be disposed on an inner diameter side of the base plate 41 of the second support member 40A.

Figure 31:
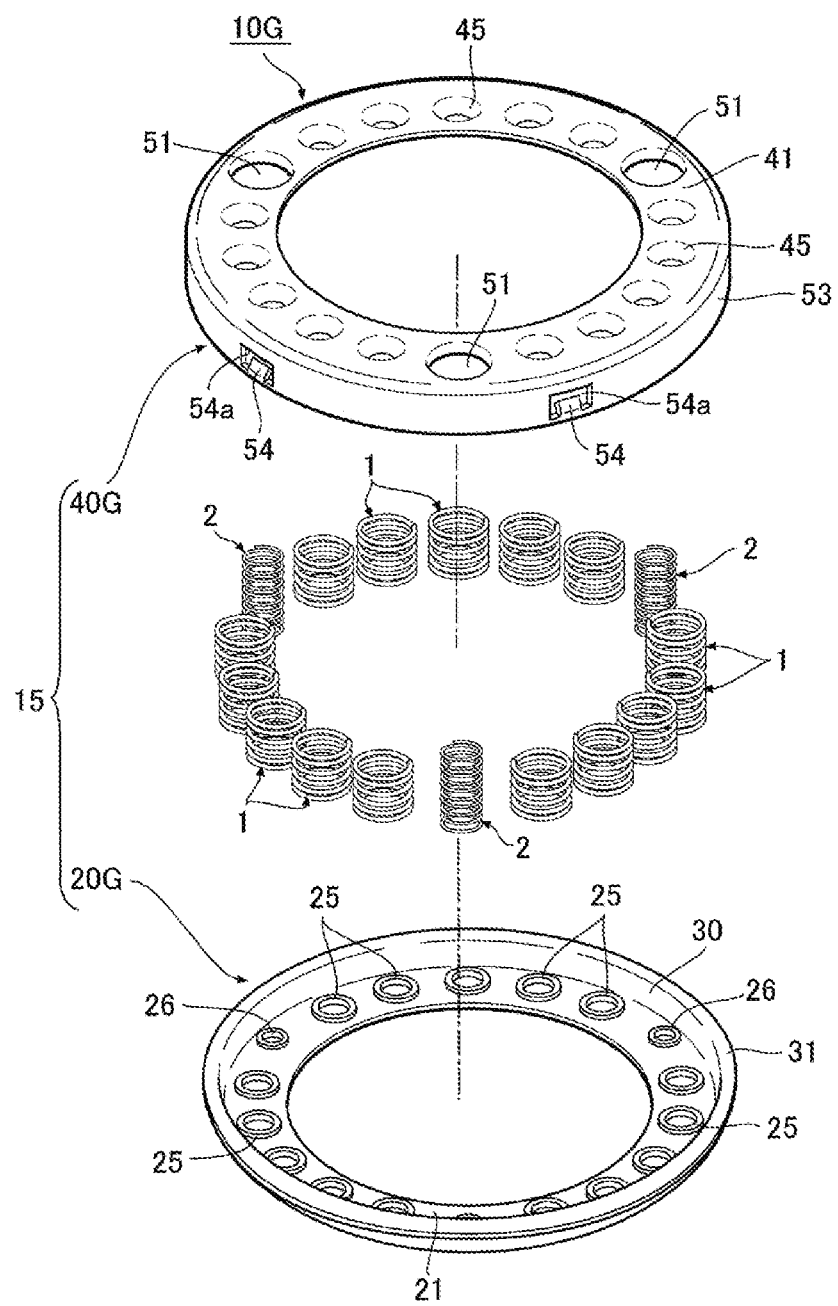
FIG. 31 is an exploded perspective view of a spring assembly according to an eighth embodiment of the present invention.
Figure 32:
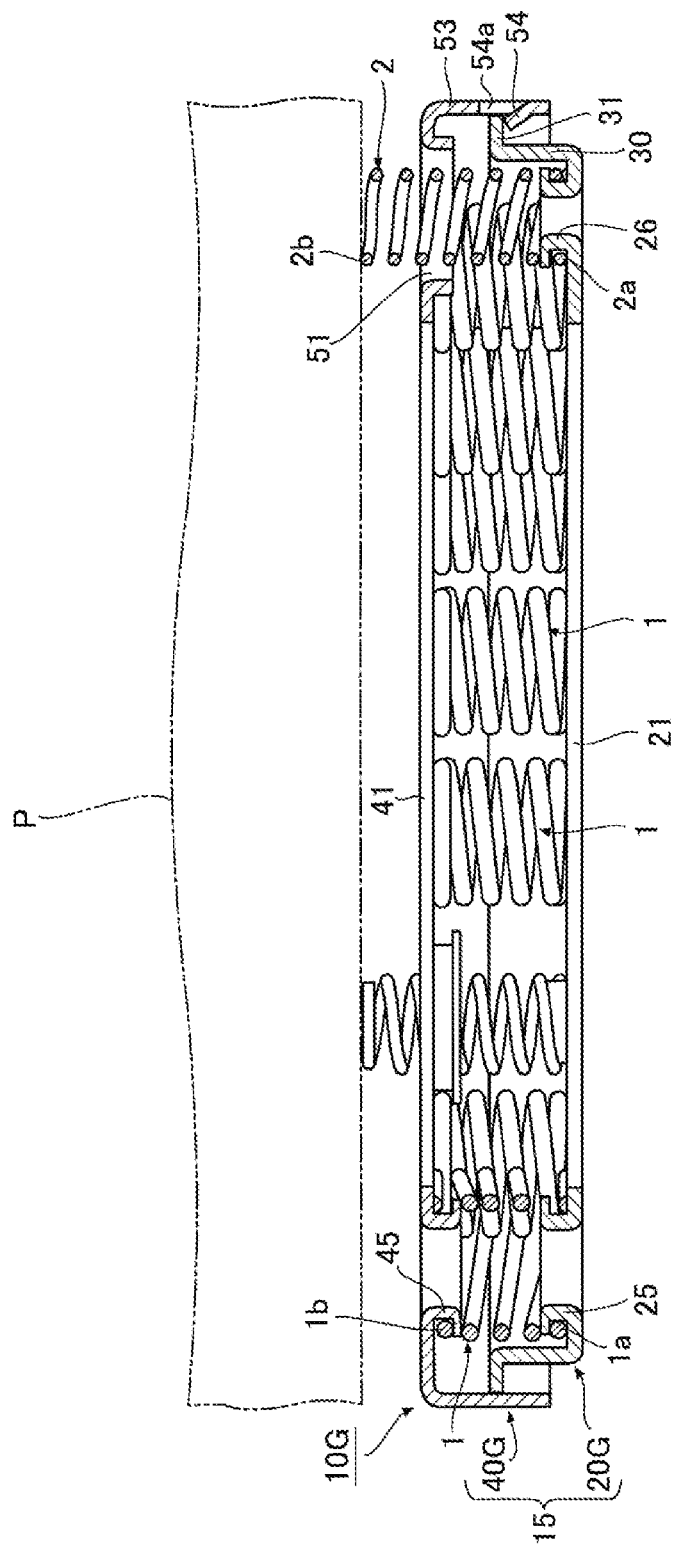
FIG. 32 is a cross-sectional view of the spring assembly.

FIGS. 31 and 32 illustrate a spring assembly according to an eighth embodiment of the present invention. The same parts as those in the above embodiment are denoted by the same reference numerals, and descriptions thereof will be omitted.

A spring assembly 10G according to the eighth embodiment mainly differs in a structure of a holding mechanism that holds the plurality of first coil springs 1 in a compressed state.

A first support member 20G according to the eighth embodiment includes a peripheral wall 30 erected toward a second support member 40G from an outer peripheral edge of the base plate 21, and an annular flange 31 protruding from an outer periphery of a tip end of the peripheral wall 30. The second support member 40G includes an annular frame-shaped wall 53 that extends toward the first support member 20G from an outer peripheral edge of the base plate 41 so as to be disposed on an outer periphery of the flange 31. The frame-shaped wall 53 includes engagement claws 54 obliquely cut and raised toward an inner diameter side of the second support member 40G via substantially U-shaped slits 54a. The engagement claws 54 engage with the flange 31 (see FIG. 32). The flange 31 may protrude from an inner periphery of the tip end of the peripheral wall 30, and the frame-shaped wall 53 may have, for example, a rectangular ring shape instead of an annular shape.

Therefore, as illustrated in FIG. 32, by engaging the engagement claws 54 of the second support member 40G with a back surface of the flange 31 of the first support member 20G, the plurality of first coil springs 1 can be held in a compressed state, and the second support member 40G can be assembled not to come off from the first support member 20G. That is, in the eighth embodiment, the flange 31 of the first support member 20G and the engagement claws 54 of the second support member 40G constitute a "holding mechanism" in the present invention. In the eighth embodiment, it is possible to ensure a relatively simple structure of the holding mechanism through which the first support member 20G and the second support member 40G are assembled while holding the plurality of first coil springs 1 in the compressed state, and to reduce manufacturing costs of the spring assembly 10G.

Figure 33A:
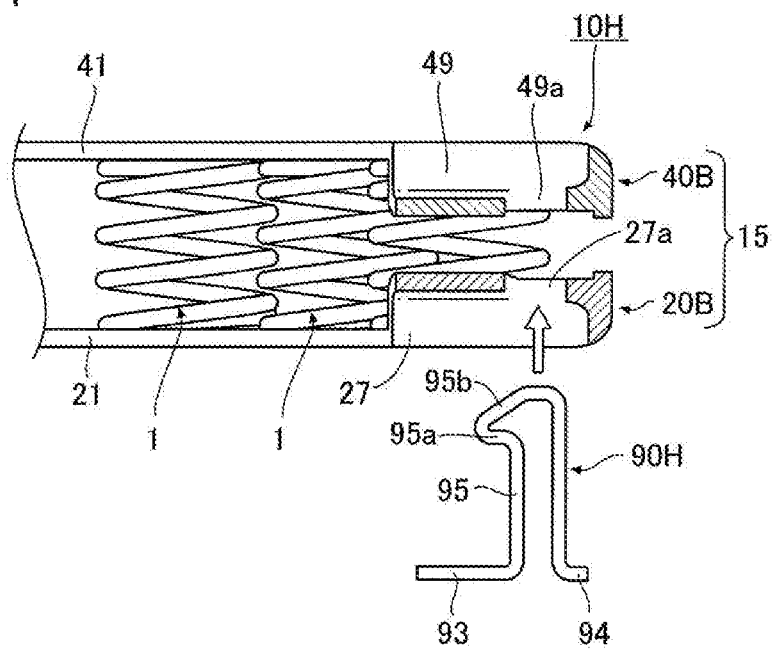
Figure 33B:
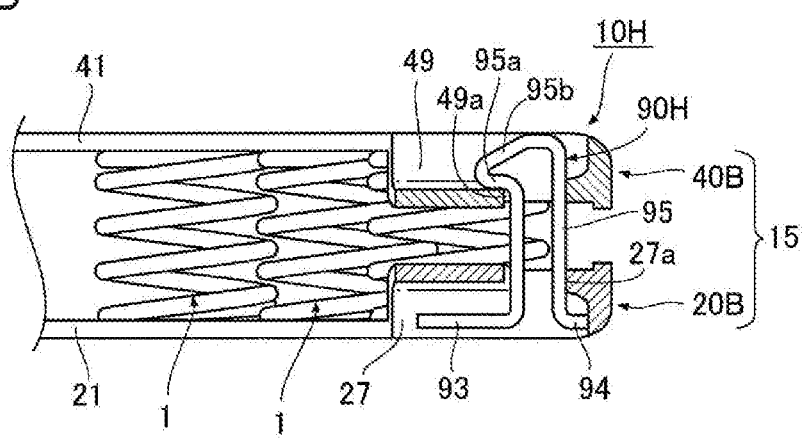

FIGS. 33A and 33B illustrate a spring assembly according to a ninth embodiment of the present invention. The same parts as those in the above embodiment are denoted by the same reference numerals, and descriptions thereof will be omitted.

A spring assembly 10H according to the ninth embodiment mainly differs in a structure of a holding mechanism that holds the plurality of first coil springs 1 in a compressed state. The ninth embodiment basically follows the structure in the third embodiment (see FIGS. 13 to 16).

The spring assembly 10H includes holding members 90H formed by bending a linear member. That is, the holding members 90H include two end portions 93 and 94, and insertion portions 95 that are bent to be orthogonal to the two end portions 93 and 94. The insertion portions 95 include engagement portions 95a on tip end sides thereof. The engagement portions 95a are bent to be orthogonal to an insertion direction toward the insertion holes 27a of the first support member 20B and the insertion holes 49a of the second support member 40B, and engage with peripheral edges on front sides of the insertion holes 49a of the engagement tubular portions 49 of the second support member 40B. The insertion portions 95 include tapered portions 95b in positions facing the engagement portions 95a, so that the insertion performance of the holding members 90H into the insertion holes 27a and 49a is enhanced.

As illustrated in FIG. 33A, when the plurality of first coil springs 1 are disposed between the first support member 20B and the second support member 40B, the insertion portions 95 of the holding members 90H are inserted into the insertion holes 27a from back sides of the engagement tubular portions 27 of the first support member 20B. At this time, the tapered portions 95b are pressed against inner peripheries of the insertion holes 27a and the insertion portions 95 are bent and pushed, and the insertion portions 95 elastically return when the engagement portions 95a reach the front sides of the insertion holes 49a, so that the engagement portions 95a engage with the peripheral edges on the front sides of the insertion holes 49a of the second support member 40B. Further, the two end portions 93 and 94 of the holding members 90H are engageable with peripheral edges on back sides of the insertion holes 27a of the first support member 20B. Accordingly, the plurality of first coil springs 1 can be held in a compressed state, and the second support member 40B can be assembled not to come off from the first support member 20B (see FIG. 33B). According to the ninth embodiment, the first support member 20B and the second support member 40B can be assembled by simply pushing the holding members 90H toward the insertion holes 27a of the first support member 20B and the insertion holes 49a of the second support member 40B, so that assembly workability can be improved.

In FIG. 33B, the two end portions 93 and 94 of the holding members 90H are not engaged with the peripheral edges on the back sides of the insertion holes 27a of the first support member 20B for illustration convenience. However, after the holding members 90H are installed, the first support member 20B and the second support member 40B are separated from each other due to elastic repulsive forces of the first coil springs 1, and accordingly, the two end portions 93 and 94 of the holding members 90H engage with the peripheral edges on the back sides of the insertion holes 27a of the first support member 20B.

Figure 34A:
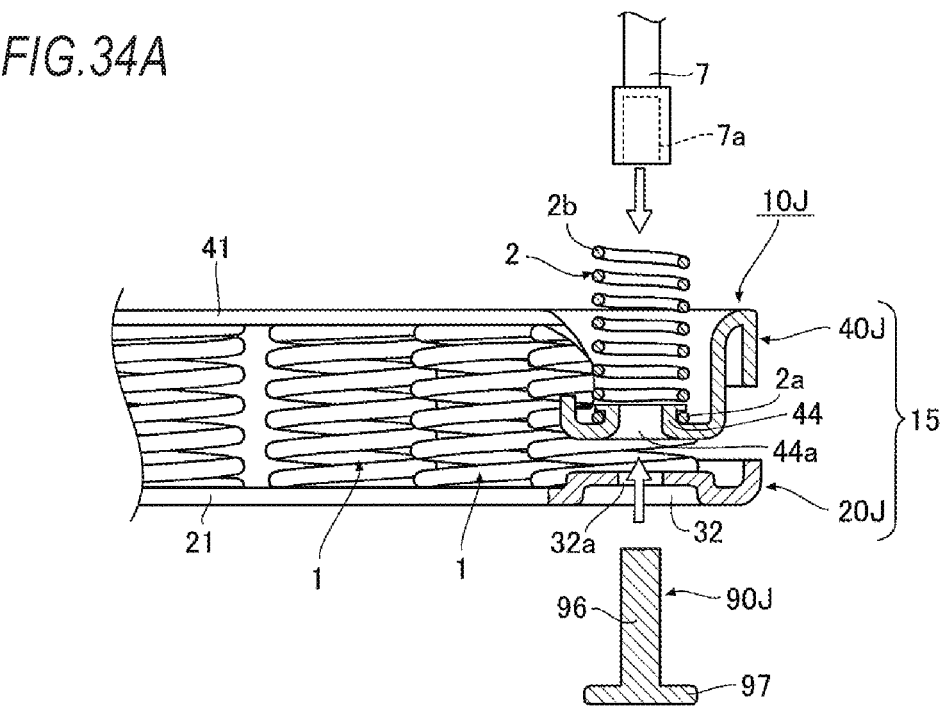
Figure 34B:
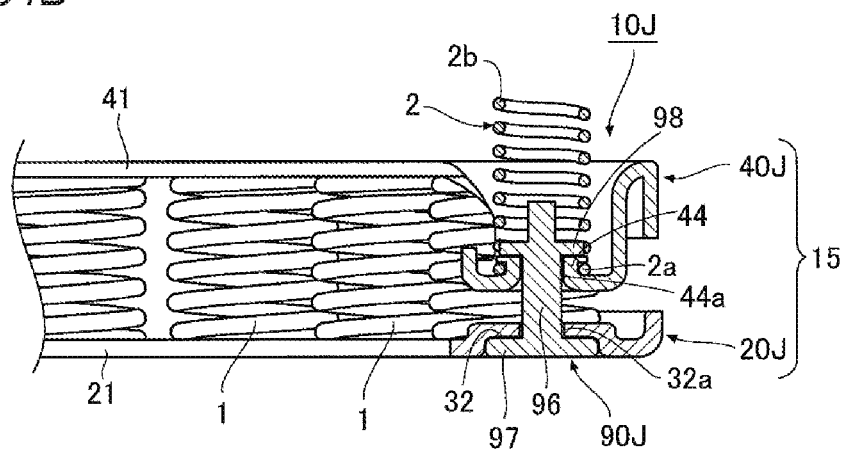

FIGS. 34A and 34B illustrate a spring assembly according to a tenth embodiment of the present invention. The same parts as those in the above embodiment are denoted by the same reference numerals, and descriptions thereof will be omitted.

A spring assembly 10J according to the tenth embodiment mainly differs in a structure of a holding mechanism that holds the plurality of first coil springs 1 in a compressed state.

The spring assembly 10J includes holding members 90J including shaft portions 96 and flange portions 97 provided at one ends of the shaft portions 96. The base plate 21 of a first support member 20J includes recesses 32 on a back side thereof into which the flange portions 97 of the holding members 90J enter. The recesses 32 further include insertion holes 32a into which the shaft portions 96 of the holding members 90J are inserted. The bottom walls 42c of the recesses 42 of the second support member 40J include insertion holes 44a through which the shaft portions 96 of the holding members 90J are inserted into inner sides of the support protrusions 44.

As illustrated in FIG. 34A, when the plurality of first coil springs 1 are disposed between the first support member 20J and the second support member 40J and the one ends 2a of the second coil springs 2 are disposed on outer peripheries of the support protrusions 44 of the recesses 42 of the second support member 40J, the shaft portions 96 of the holding members 90J are inserted into the insertion holes 32a from the back side of the base plate 21 of the first support member 20J. Thereafter, when the shaft portions 96 of the holding members 90J are inserted through the insertion holes 44a of the second support member 40J and the flange portions 97 of the holding members 90J enter and are engaged in the recesses 32 of the first support member 20J, tip end sides of the shaft portions 96 of the holding members 90J are crimped by jigs 7 including recesses 7a on tip end sides thereof.

Accordingly, as illustrated in FIG. 34B, the crimped portions 98 are formed on the tip end sides of the shaft portions 96 of the holding members 90J and are engaged with upper ends of the support protrusions 44, and the flange portions 97 of the holding members 90J engage with the recesses 32 of the first support member 20J. Accordingly, the plurality of first coil springs 1 can be held in a compressed state, and the second support member 40J can be assembled not to come off from the first support member 20J. The shaft portions 96 of the holding members 90J also serve as support guides of the second coil springs 2 since the shaft portions 96 are disposed in inner peripheries of the second coil springs 2.

The holding members may have, for example, pin shapes including shaft portions and engagement protrusions on tip end sides of the shaft portions in an axial direction. In this case, the holding members are inserted from upper openings of the insertion holes 44a of the second support member 40J from base end sides of the shaft portions and the engagement protrusions are engaged with upper ends of the support protrusions 44, and the base end sides of the shaft portions are inserted through lower openings of the insertion holes 32a of the first support member 20J. At this state, the base end sides of the holding members are crushed into flange shapes and engage with the recesses 32 of the first support member 20J by pressing the base end sides of the shaft portions of the holding members from the insertion holes 32a of the first support member 20J with crimped portions. Accordingly, the second support member 40J can be assembled not to come off from the first support member 20J.

The present invention is not limited to the embodiments described above and various modified embodiments can be made within the scope of the present invention, and such embodiments are also within the scope of the present invention.

REFERENCE SIGNS LIST 10, 10A, 10B, 10C, 10D, 10E, 10F, 10G, 10H, 10J spring assembly
15 spring support member
20, 20A, 20B, 20D, 20G, 20J first support member
40, 40A, 40B, 40C, 40D, 40E, 40G, 40J second support member
42 recess
60, 60E, 60F pressing plate
70, 70D third support member
90, 90H, 90J holding member

The invention claimed is:

1. A spring assembly comprising coil springs supported on a spring support member,
wherein the coil springs include at least a plurality of first coil springs and a second coil spring,
wherein the spring support member includes a first support member and a second support member disposed to face the first support member,
wherein one ends of the plurality of first coil springs are supported on a front surface of the first support member,
wherein one end of the second coil spring is supported on the front surface of the first support member or a front surface of the second support member, and in this state, another end of the second coil spring protrudes further than other ends of the plurality of first coil springs,
wherein a sum of elastic repulsive forces of the plurality of first coil springs is larger than an elastic repulsive force of the second coil spring in a state where the plurality of first coil springs and the second coil spring are compressed,
wherein the other ends of the plurality of first coil springs are supported on a back surface of the second support member,
wherein a holding mechanism that holds the plurality of first coil springs in a compressed state is provided between the first support member and the second support member,
wherein when the second coil spring is pressed, after the other end of the second coil spring is compressed to a length of not protruding from the front surface of the second support member, the first coil springs held in the compressed state by the holding mechanism are further compressed from the compressed state.

2. The spring assembly according to claim 1, wherein the second support member includes a recess recessed toward the first support member, and the one end of the second coil spring is supported on a front surface of the recess.

3. The spring assembly according to claim 2, wherein the holding mechanism is provided between the first support member and the recess of the second support member.

4. The spring assembly according to claim 3, wherein the holding mechanism includes a holding wall provided on the first support member and a holding protrusion provided on a bottom wall of the recess, and
wherein the holding wall is formed with a slide hole into which the holding protrusion is slidably inserted.

5. The spring assembly according to claim 1, wherein the second support member includes a recess recessed toward the first support member.

6. The spring assembly according to claim 5, wherein the holding mechanism is provided between the first support member and the recess of the second support member.

7. The spring assembly according to claim 6, wherein the holding mechanism includes a holding wall provided on the first support member.

8. The spring assembly according to claim 6, wherein the holding mechanism includes a holding protrusion provided on a bottom wall of the recess.

9. The spring assembly according to claim 8, wherein the holding wall is formed with a slide hole into which the holding protrusion is slidably inserted.

10. The spring assembly according to claim 1, wherein the second support member includes a recess that supports the one end of the second coil spring.

11. The spring assembly according to claim 10, wherein the holding mechanism is provided between the first support member and the recess of the second support member.

12. The spring assembly according to claim 1, wherein an outer diameter of the second coil spring is less than an outer diameter of the first coil springs.

13. A spring assembly comprising coil springs supported on a spring support member,
wherein the coil springs include at least a plurality of first coil springs and a second coil spring,
wherein the spring support member includes a first support member and a second support member disposed to face the first support member,
wherein one ends of the plurality of first coil springs are supported on a front surface of the first support member,
wherein one end of the second coil spring is supported on the front surface of the first support member or a front surface of the second support member, and in this state, another end of the second coil spring protrudes further than other ends of the plurality of first coil springs,
wherein a sum of elastic repulsive forces of the plurality of first coil springs is larger than an elastic repulsive force of the second coil spring in a state where the plurality of first coil springs and the second coil spring are compressed,
wherein the other ends of the plurality of first coil springs are supported on a back surface of the second support member, wherein a holding mechanism that holds the plurality of first coil springs in a compressed state is provided between the first support member and the second support member, wherein when the second coil spring is pressed, after the other end of the second coil spring is compressed to a length of not protruding from the front surface of the second support member, the first coil springs held in the compressed state by the holding mechanism are further compressed from the compressed state, and wherein one end of the second coil spring is supported on the front surface of the first support member or a front surface of the second support member, and in this state, another end of the second coil spring protrudes further than other rends of the plurality of the first coil springs.

14. A spring assembly comprising coil springs supported on a spring support member, wherein the coil springs include at least a plurality of first coil springs and a second coil spring, wherein the spring support member includes a first support member and a second support member disposed to face the first support member, wherein one ends of the plurality of first coil springs are supported on a front surface of the first support member, wherein one end of the second coil spring is supported on the front surface of the first support member or a front surface of the second support member, and in this state, another end of the second coil spring protrudes further than other ends of the plurality of first coil springs, wherein a sum of elastic repulsive forces of the plurality of first coil springs is larger than an elastic repulsive force of the second coil spring in a state where the plurality of first coil springs and the second coil spring are compressed, wherein the other ends of the plurality of first coil springs are supported on a back surface of the second support member, wherein a holding mechanism that holds the plurality of first coil springs in a compressed state is provided between the first support member and the second support member, wherein when the second coil spring is pressed, after the other end of the second coil spring is compressed to a length of not protruding from the front surface of the second support member, the first coil springs held in the compressed state by the holding mechanism are further compressed from the compressed state, and wherein the second support member includes a recess recessed toward the first support member, and the one end of the second coil spring is supported on a front surface of the recess.

15. The spring assembly according to claim 14, wherein the second support member includes a recess recessed toward the first support member.

16. The spring assembly according to claim 14, wherein the second support member includes a recess that supports the one end of the second coil spring.

17. The spring assembly according to claim 16, wherein the holding mechanism is provided between the first support member and the recess of the second support member.

18. The spring assembly according to claim 17, wherein the holding mechanism is provided between the first support member and the recess of the second support member.

19. The spring assembly according to claim 18, wherein the holding mechanism includes a holding wall provided on the first support member.

20. The spring assembly according to claim 18, wherein the holding mechanism includes a holding protrusion provided on a bottom wall of the recess.

* * * * *